United States Patent [19]
Wang et al.

[11] Patent Number: 6,157,635
[45] Date of Patent: Dec. 5, 2000

[54] INTEGRATED REMOTE DATA ACCESS AND AUDIO/VISUAL CONFERENCE GATEWAY

[75] Inventors: Peter Si-Sheng Wang, Cupertino; Ismail Dalgic, Mountain View; Kenneth Araujo, Sunnyvale, all of Calif.

[73] Assignee: 3Com Corporation, Santa Clara, Calif.

[21] Appl. No.: 09/023,174

[22] Filed: Feb. 13, 1998

[51] Int. Cl.[7] .................................................. H04Q 11/04
[52] U.S. Cl. ......................... 370/352; 370/264; 370/401; 370/465; 370/474
[58] Field of Search .................................. 370/252, 257, 370/264, 270, 352, 353, 401, 402, 426, 465, 466, 467, 469, 265, 474, 476

[56] References Cited

U.S. PATENT DOCUMENTS

| 5,153,876 | 10/1992 | Sin ......................................... 370/401 |
| 5,442,630 | 8/1995 | Gagliardi et al. ..................... 370/85.13 |
| 5,577,033 | 11/1996 | Chang et al. .............................. 370/60 |
| 5,586,273 | 12/1996 | Blair et al. .............................. 370/466 |
| 5,943,481 | 8/1999 | Wakeland ................................ 370/466 |
| 5,974,467 | 10/1999 | Haddock et al. ........................ 370/426 |
| 6,026,086 | 2/2000 | Lancelot et al. ........................ 370/353 |

FOREIGN PATENT DOCUMENTS

0771095 A2  2/1997  European Pat. Off. ........ H04L 12/00

*Primary Examiner*—Douglas W. Olms
*Assistant Examiner*—Shick Hom
*Attorney, Agent, or Firm*—Wilson Sonsini Goodrich & Rosati

[57] ABSTRACT

An apparatus for converting frame-type transmissions to packet-type transmissions. In one embodiment, the apparatus comprises a medium access controller (MAC) coupled to a packet-based network and multiple packet assembler/disassemblers (PADs). The PADs include a data link layer (DLL) PAD coupled to the MAC, a high level data link control (HDLC) PAD coupled to the DLL PAD, a network layer (NL) PAD coupled to the DLL PAD, and a NL/frame alignment sequence-bit-rate allocation signal (NL/FAS-BAS) PAD coupled to the DLL PAD. Multiple detection units are coupled to respective PADs, wherein each of the plurality of detection units detects a frame-type transmission.

8 Claims, 14 Drawing Sheets

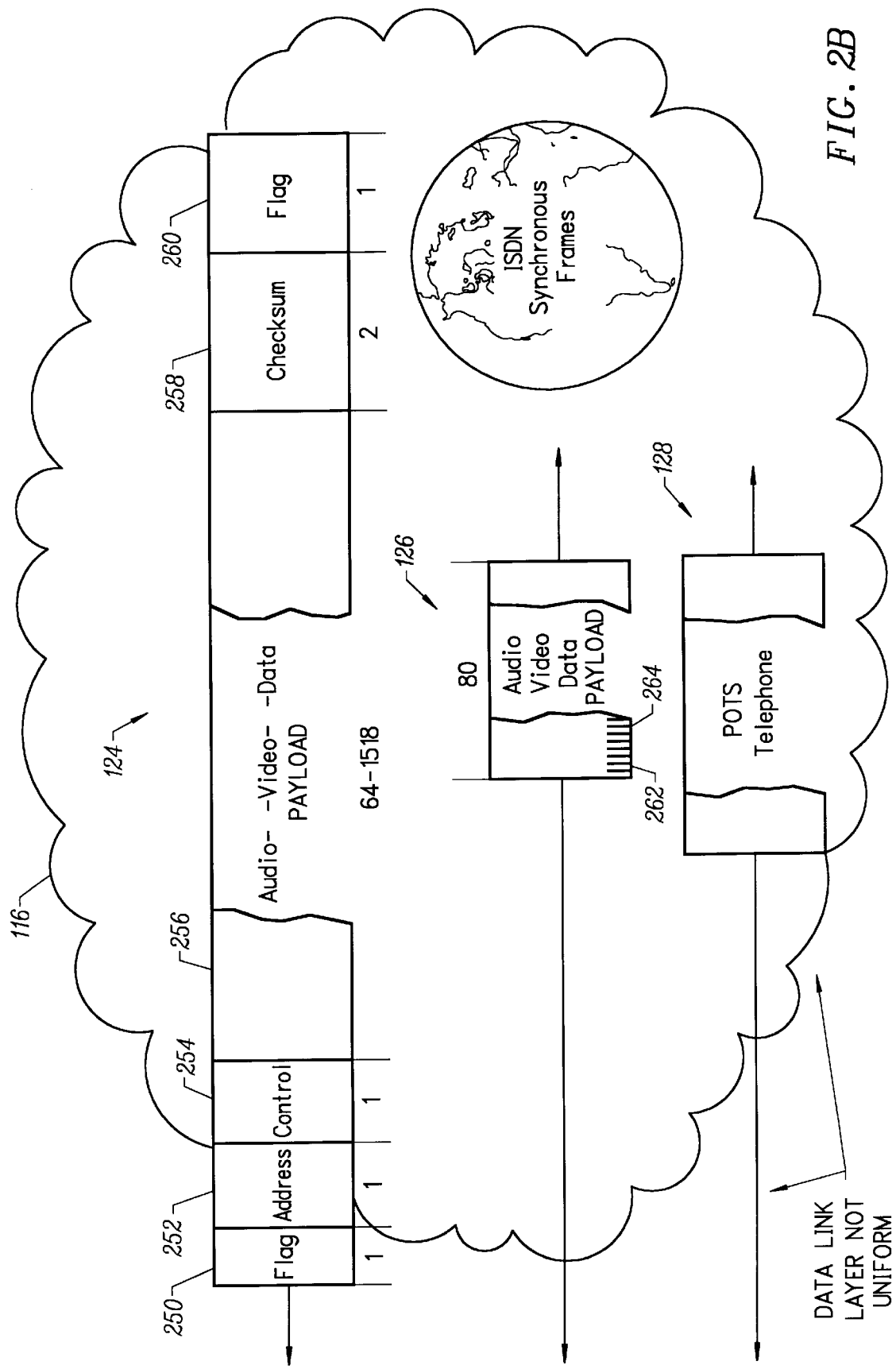

HDLC Process

INTEGRATED REMOTE DATA ACCESS AND AUDIO/VISUAL CONFERENCE GATEWAY

BACKGROUND OF THE INVENTION

1. Field of Invention

The invention is directed generally to gateways, bridges, and routers and more particularly, to a method and apparatus for interfacing a local area network (LAN) with a Integrated Services Digital Network (ISDN).

2. Description of Related Art

Networks can be organized in a number of ways, either globally covering great distances or they can be local area networks (LAN) covering relatively short distances. A LAN ordinarily will consist of computers distributed within an office, a building or a campus. Generally speaking, a LAN includes: 1) a high speed transmission medium, typically metallic or fiber optic, for connecting each of the devices to the LAN; 2) the ability to transmit a message on the transmission medium directed to a single device; and 3) a means known as "broadcast" in which all devices connected to the LAN medium can receive a message transmitted on the medium. Several standards for the implementation of LAN devices and systems have been established by the Institute of Electrical and Electronic Engineers LAN/MAN Standards Committee (Project 802).

The physical length of the transmission medium and the total number of devices connected thereto are typically limited on a LAN due to the physics of high speed transmission systems. Bridges and routers are devices used to connect multiple LANs to provide communications between individual LANs and to construct large networks that transcend the technical size limits of a single individual LAN. When the individual LANs to be interconnected are at geographically remote locations, bridges and routers are used in pairs, one at each site, to provide a path for data to flow from one LAN to another.

An all-digital telephone network, known as the Integrated Services Digital Network (ISDN), has become a potential substitute for the private long distance lines currently used by bridges and routers. ISDN provides relatively high speed digital transmission service on an "as needed" basis, and is different from LAN transmission media in that it is a circuit switched transmission media which provides a point-to-point transmission service on an intermittent basis. ISDN enables local area networks to be interconnected with each other to form a wide area network. The ISDN network architecture is based on standards set by International Telecommunications Union (ITU) with standards in the United States largely driven by Bellcore. Two types of ISDN service are available: Basic Rate ISDN (BRI) and Primary Rate ISDN (PRI). BRI delivers two B-channels, each having a capacity of 64 Kbps and a 16 Kbps D-channel. PRI provides twenty three B-channels of 64 Kbps and a 64 Kbps D-channel. The D-channel is used for signaling between the central office switch and terminating equipment which could be a telephone set, personal computer, videoconferencing set or other device. The B-channels are used for any kind of service including voice data and video.

Both IEEE 802 LANs and ISDN are structured by architecture closely following the Open Systems Interconnection (OSI) Seven Layer Reference Model. The OSI model decomposes a communication system into seven major components or layers which are defined by international standards. The OSI model is concerned with the interconnection between systems, i.e., the way they exchange information, and not with the internal functions that are performed by a given system. Communications between systems are organized into information that is exchanged between entities at each layer. The mechanism for communication between two systems at a single layer is referred to as a protocol, i.e., "a layer x protocol."

The first layer is known as the physical layer and is responsible for the transmission of bit streams across a particular physical transmission medium. This layer involves a connection between two machines that allows electrical signals to be exchanged between them.

The second layer is the data link layer (DLL), and is responsible for providing reliable data transmission from one node to another and for shielding higher layers from any concerns about the physical transmission medium. It is concerned with the error-free transmission of frames of data.

The third layer, the network layer (NL), is concerned with routing data from one network node to another and is responsible for establishing, maintaining, and terminating the network connection between two users and for transferring data along that connection. There is normally only one network connection between two given users, although there can be many possible routes from which to choose when the particular connection is established.

The fourth layer is the transport layer (TL), and is responsible for providing data transfer between two users at an agreed on level of quality. When a connection is established between two users, the transport layer is responsible for selecting a particular class of service to be used, for monitoring transmissions to ensure the appropriate service quality is maintained, and for notifying the users if it is not.

The fifth layer is the session layer, and it focuses on providing services used to organize and synchronize the dialog that takes place between users and to manage the data exchange. A primary concern of the session layer is controlling when users can send and receive, based on whether they can send and receive concurrently or alternately.

The sixth layer is the presentation layer, and is responsible for the presentation of information in a way that is meaningful to network users. This may include character code translation, data conversion or data compression and expansion.

The seventh layer is the application layer, and it provides a means for application processes to access the system interconnection facilities in order to exchange information. This includes services used to establish and terminate the connections between users and to monitor and manage the systems being interconnected and the various resources they employ.

Network devices such as bridges, routers and gateways each operate at a separate one of the seven OSI layers. Bridges are data-link layer devices that connect similar networks together, e.g., Ethernet to Ethernet. Routers are network layer devices that perform routing by maintaining a routing table in each host. Gateways operate at the higher OSI Layers, carrying out protocol conversion and other connectivity functions.

Information transferred across networks includes headers and payload, where the headers contain information specific to one of the corresponding seven layers of the OSI model. Headers and payload on a LAN are referred to as a packet. Headers and payload on an ISDN are referred to as frames. Until recently network traffic on either a LAN or ISDN network comprised packets/frames with up to seven headers, and a payload. The headers contained information specific to each of the seven layers of the OSI model. The payload contains the audio, video, or data being transferred. On the LAN the structure of headers and payload is specified by the respective IEEE LAN standard such as 802.3, 802.5 etc.. These standards are heriniafter referred to as 802.x. On the ISDN side the structure of the headers and payload is specified by the High-Level Data Link Control (HDLC) standard promulgated by the International Standards Organization (ISO).

New standards for televideo transmissions promulgated by International Telecommunications Union have significantly altered the relative symmetry between frame and packet construction on respectively ISDN and LAN networks. The International Telecommunications Union has proposed protocols for packet and frame transmission over packet switched and circuit switched networks for televideo conferencing. The International Telecommunications Union standards for televideo conference traffic on a point-to-point network such as ISDN are described in specification H.320 entitled, *"Narrow-Band Visual Telephone Systems and Terminal Equipment"* revised on March 1996. The corresponding standard for televideo conference traffic on a LAN is described in International Telecommunications Union's specification H.323 entitled, *"Visual Telephone Systems and Equipment for Local Area Networks which Provide a Non-Guaranteed Quality of Surface"* revised November 1996. The H.320 standard addresses the issues of achieving a natural relationship between the visual image and the oral message for the viewer/listener. An additional benefit to the specification is that in contrast to preexisting DLL frame protocols for communication such as HDLC, an H.320 frame has a higher percentage of data as opposed to header bits in each frame than does HDLC. Thus, processing time is reduced and data throughput is increased for televideo conferencing traffic transmitted in H.320 frames as opposed to identical traffic transmitted in HDLC frames.

Unfortunately existing gateways, routers and bridges require dedicated transmission lines for HDLC and for H.320 traffic, because the protocols differ so significantly at the DLL level. What is needed is a device which can integrate the handling of the H.320 frames and the HDLC frames.

SUMMARY OF THE INVENTION

In a first embodiment of the invention a gateway for interfacing a packet switched network and a circuit switched network is disclosed. The packet switched network transmits information packets tagged with at least a destination address and the circuit switched network transmits information frames. The gateway includes a first and second packet assembler and disassembler and a detection module. The first packet assembler and disassembler receives a first frame of information tagged with a first type of start-of-frame flag and places the first frame of information on the packet switched network with the first start-of-frame flag replaced with a first destination address. The second packet assembler and disassembler receives a second frame of information tagged with a second type of start-of-frame flag and places the second frame of information on the packet switched network with the second start-of-frame flag replaced with a second destination address. The detection module detects a plurality of transmission frames on the circuit switched network. The detection module detects the first start-of-frame flag on the first frame and passes the first frame to the first packet assembler and disassembler. The detection module detects the second start-of-frame flag on the second frame and passes the second frame to the second packet assembler and disassembler.

In a second embodiment of the invention, an integrated gateway bridge and router for interfacing a packet switched network to an ISDN is disclosed. The packet switched network transmits information packets tagged with at least a destination address and the ISDN transmits information in a plurality of DLL protocols. The integrated gateway bridge and router includes a first and second packet assembler and disassembler, a switchable bridge and router, and a detection module. The first packet assembler and disassembler receives a first frame of information tagged with a first DLL protocol, and places the first frame of information on the packet switched network with the first DLL protocol tag replaced with a first destination address. The switchable bridge and router switchably interfaces with the first packet assembler to perform as a router by selecting the first destination address utilizing a network layer address in the first frame of information and a router table. The switchable bridge and router performs as a bridge by accepting as the first destination address a MAC address tagged to the first frame of information which medical access control (MAC) address corresponds to an entry in a bridge table. The second packet assembler and disassembler receives a second type of frame of information tagged with a second DLL protocol and places the second type of frame of information on the packet switched network with the second DLL protocol tag replaced with a second destination address. The detection module detects on the circuit switched network, a plurality of transmission frame types including the first frame type and the second frame type. When the detection module detects the first DLL protocol on the first frame type, the frame is passed to the first packet assembler and disassembler. When the detection module detects the second DLL protocol on a frame, the frame is passed to the second packet assembler and disassembler.

In a third embodiment of the current invention, a method for allowing communication between a packet switched network and a circuit switched network is disclosed. The method comprises the acts of:

receiving from the circuit switched network, an information stream in a plurality of DLL protocols including a first DLL protocol and a second DLL protocol;

detecting a call setup request;

allocating a channel within the information stream responsive to the call setup request;

analyzing information on the channel;

classifying the information on the channel with a session protocol identifier corresponding to a one among the plurality of DLL protocols utilized for the call session;

performing a first packet assembly process on the allocated channel when the session protocol identifier corresponds to the first DLL protocol, and the first packet assembly process placing information packets on the packet switched network; and performing a second packet assembly process on the allocated channel when the session protocol identifier corresponds to the second DLL protocol, and the first packet assembly process placing information packets on the packet switched network.

DESCRIPTION OF FIGURES

FIG. 2B shows three frame formats transmitted on the point-to-point network shown in FIG. 1.

DETAILED DESCRIPTION

An integrated gateway bridge and router (IGBR) is disclosed in which method and apparatuses are provided for handling internetwork communication between a packet switched network and a frame based point-to-point circuit switched network, where communications are conducted in a variety of packet and frame protocols. The IGBR allows a single communication line on the point-to-point network to be utilized for handling a variety of frame protocols. Remote access and teleconferencing traffic therefore, can be handled on a single point-to-point link. In the embodiment shown the IGBR is configured to handle on a single point-to-point link: remote access communications using High Level Data Link Control (HDLC) protocol, multi-link point-to-point protocols (PPP), teleconferencing traffic using the International Telecommunications Union (ITU) H.320 protocol, or plain old telephone calls (POTS). The method and apparatus is disclosed for automatically determining the type of the call originating on the point-to-point network i.e., remote access bridge/router, H.320 or plain old telephone service (POTS), for configuring the IGBR accordingly, and for completing the call to a recipient located on a packet switched network. Because the IGBR has the ability to distinguish HDLC frames, H.320frames and plain old telephone service (POTS) a single point-to-point connection, a dedicated point-to-point line for H.320 televideo conference traffic is not required.

The frames which the IGBR has the ability to distinguish differ in length and format at what, in the traditional Open Systems Interface (OSI) nomenclature, is called the Data Link Layer (DLL). DLL protocols are utilized to handle communications across a single network, as opposed to network layer (NL) protocols which are hierarchical and are used to handle communications from an initial source to a final destination across possibly many networks. An additional set of protocols, the transport layer (TL) protocols, are utilized to assure communication reliability, urgency, and acknowledgment. Because the IGBR has the ability to distinguish frames at the DLL it is capable of handling both the older transmission protocols such as HDLC which wrap each payload with several layers of headers as well as the newer transmission protocols such as H.320 which use only a single abbreviated header. For purposes of this disclosure a reference to an H.320 header will be understood to refer to what is more commonly identified in technical literature as the H.320 service channel. These newer transmission protocols allow more payload to be carried over existing lines. Thus, the ability of the IGBR to handle both types of traffic on a single point-to-point line increases the functionality of the existing communications infrastructure.

Figure 1:
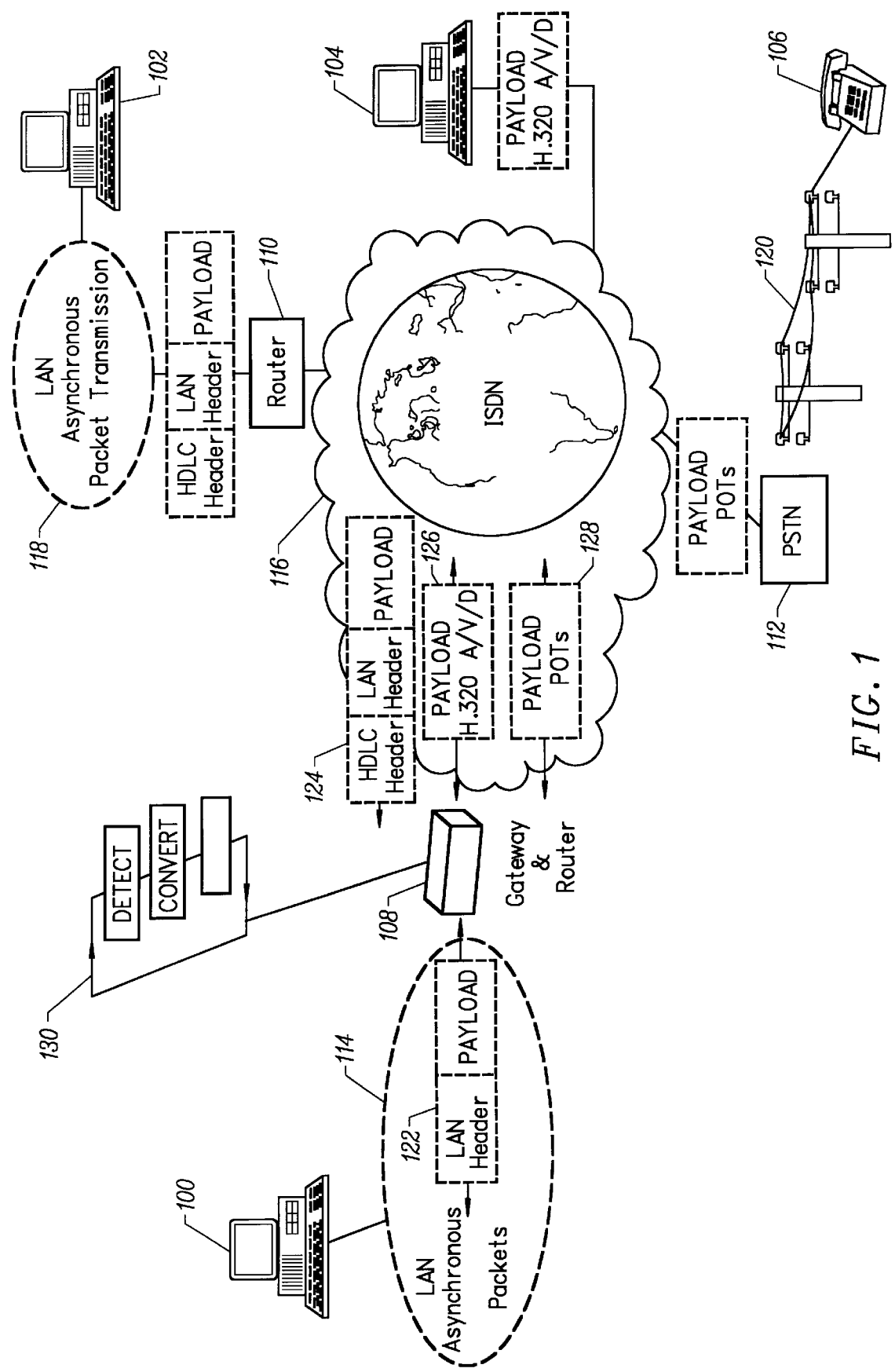
FIG. 1 shows an embodiment of a gateway/router connecting a point-to-point network with a packet based network.

FIG. 1 shows clients 100–104, telephone 106, IGBR 108, router 110 and central office 112 of the public switch telephone network (PSTN). Client 100 is connected via a local area network (LAN) 114 to IGBR 108. Client 102 is connected via LAN 118 to router 110. Router 110 is connected via point-to-point network 116 to IGBR 108. Client 104 is connected via Point-point-point network to IGBR 108. Telephone 106 is connected via analog signal lines 120 to central office 112. Central office 112 is connected via Point-point-point 116 to IGBR 108. The LAN implements packet switched communication with carrier sense multiple access and collision detection (CSMA/CD). Although the embodiment shown in FIG. 1 implements the current invention on an 802.3 LAN, it will be obvious to those skilled in the art that the invention can be practiced with equal advantage on any other packet switched network, including for example: IEEE 802.5, Frame Relay, ANSI X3T9.5, Fiber-Channel, etc.. The synchronous point-to-point network implements circuit switched point-to-point communication with time division multiplexing (TDM) in which separate communication channels are provided over each of the point-to-point links.

Synchronous Point-point-point network 116 is shown carrying three frame types 124–128, respectively HDLC, H.320, and POTS. The IGBR 108 is able to detect and distinguish each of these frame types and convert them into a packet 122 suitable for transmission on LAN 114. The IGBR performs the processes 130 of call setup, frame detection, channel allocation and protocol/framing conversion. Thus, the IGBR 108 of the current invention allows a single physical Point-point-point link to carry a plurality of frame protocols distinguishable at the DLL on the same ISDN physical link.

Figure 2A:
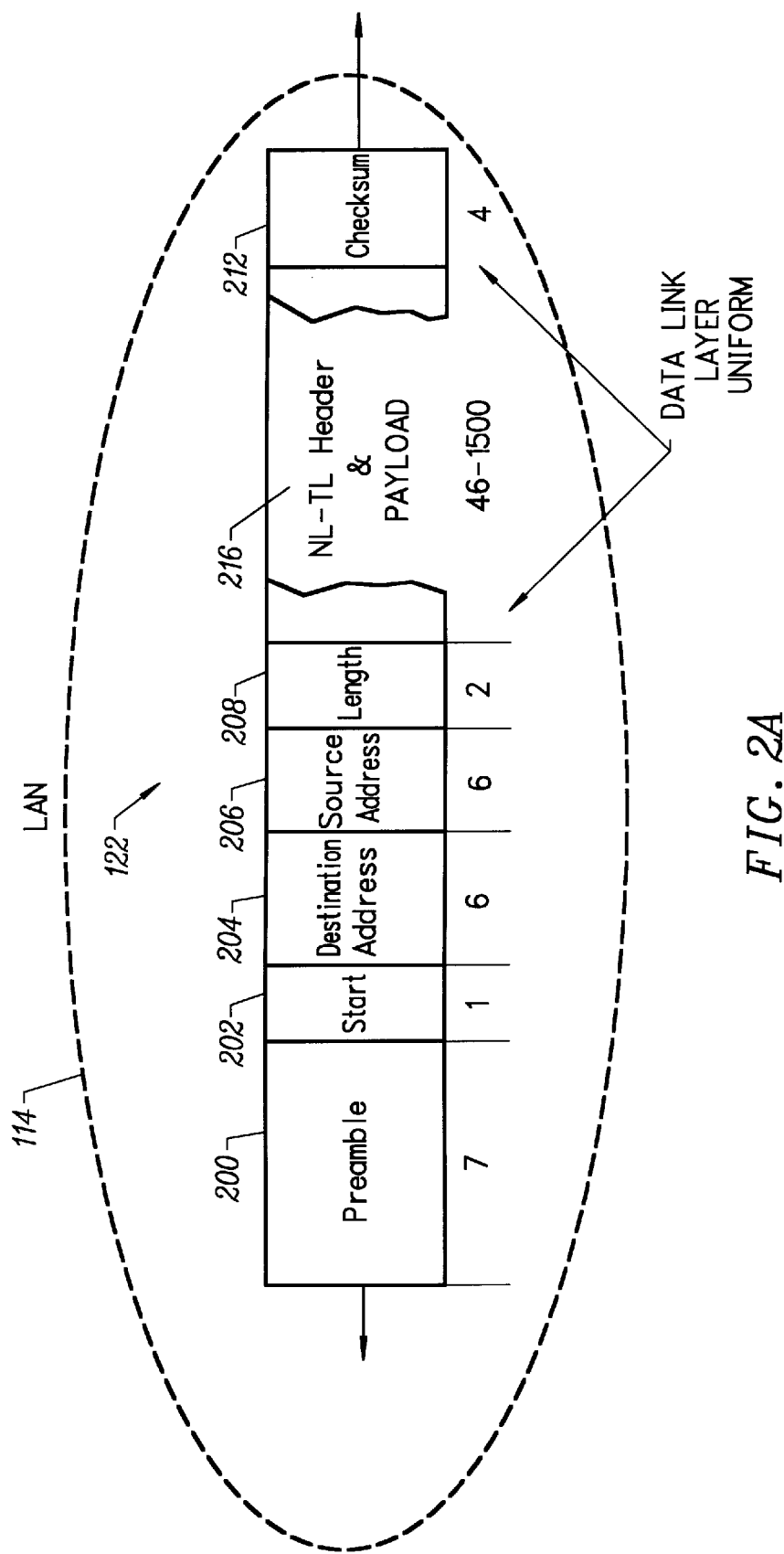
FIG. 2A shows the details of the packet structure on the packet based network shown in FIG. 1.

FIG. 2A shows a detailed view of one of the possible packet types which can be transmitted over LAN 114 [see FIG. 1]. The details of the data link layer wrapper for packet 122 are shown. Specifically, the DLL protocol for this packet is shown as conforming with the IEEE 802.3 specification. The 802.3 packet begins with a preamble 200. The preamble is seven bytes in length with each byte containing the bit pattern 10101010. The preamble allows the receiver's clock to synchronize with the sender. Next comes the start of frame flag 202 containing the binary sequence 1010101. Next is the destination address 204 which is six bytes in length followed by a source address 206 which is also six bytes in length. The length field 208 follows. The length field which is two bytes in length indicates how many bytes are present in the data/payload field from a minimum of zero to a maximum of 1500 bytes. Within the payload field 216 audio, video and data can be transported. The payload field also contains headers which in the nomenclature of the OSI model are defined as the network layer and transport layer headers. Immediately following the pay load is check sum filed 212.

FIG. 2B shows three of the possible frame formats which can be transmitted over point-to-point network 116 [see FIG. 1] and processed by the IGBR of the current invention. The frame protocols are distinguishable, in the nomenclature of the traditional OSI reference model, at the data link layer.

The first of the data link layer frame formats is frame 124 which is a high-level data-link control (HDLC). HDLC is a bit-oriented line protocol specification published by the International Standards Organization (ISO) and used throughout the world. The standard provides for many functions and covers a wide range of applications and is frequently used as a foundation for other protocols such as link access protocol for ISDN channel B (LAPB). The HDLC frame is initialized and terminated with one byte flags respectively 250, 260 which contain a fixed predetermined binary sequence. Following binary flag 250 at the beginning of a packet is an address field 252 one byte in length. The address field is primarily of importance on lines with multiple terminals where it is used to identify one of the terminals. It is also sometimes used to distinguish commands from responses. Immediately following the address field is a control field 254 also one byte in length. The control field is used for sequence numbers, acknowledgments and to distinguish between information, supervisory and unnumbered frames. The payload field 256 which is 64 to 1,518 bytes in length follows the control field. The payload field may contain audio video or data and in addition contains the protocols and/or addresses for what in the OSI model are referred to as the network transport session and presentation layers. Immediately following the payload field is the check sum field 258. The check sum field is a minor variation on the well known cyclic redundancy check according to the international telecommunications union (ITU). The variation is to allow lost flag bytes to be detected. The flag sequences 250, 262 contain the bits 01111110. To avoid emulation of the flag bits and therefore possible confusion as to the start and stop of a frame, a protocol called bit and/or byte stuffing is utilized in which sequences identical to the flag sequence found in the payload portion are altered during the creation of an HDLC frame and transmitted in the altered form thus avoiding emulation. Upon receipt of the HDLC frame the stuffing at either a bit or a byte level is detected and payload is returned to its original condition.

The next frame which can be handled by the IGBR of the current invention is the H.320 frame 126 which is specifically dedicated to televideo conferencing over narrow band circuit switched networks such as ISDN. This frame specified by the ITU H.221 specification is of predetermined length, i.e., 80 bytes. Only two of those bytes are devoted to a DLL header and, in contrast to the HDLC frame there are no NL or TL headers. The H.221 protocol takes full advantage of point-to-point nature of the ISDN network, and its out of line control channel, (i.e., the D channel provided by ISDN) in that it does not include either a NL or TL header, rather the equivalent functionality for these are provided over the separate ISDN D channel during the call setup phase. The H.221/H.320 header 262–264 does include specific information related to frame sequencing, alignment and error correction.

Another of the DLL frame types suitable for use with the integrated gateway and router of the current invention is POTS frame 128. This frame contains digitized voice data originating on an analog telephone 106 [see FIG. 1] over a public switch telephone network (PSTN). POTS frames contain neither a DLL, NL, or TL header, only 8-bit values corresponding to PCM audio samples obtained according to the ITU-T Standard G.711.

Figure 3A:
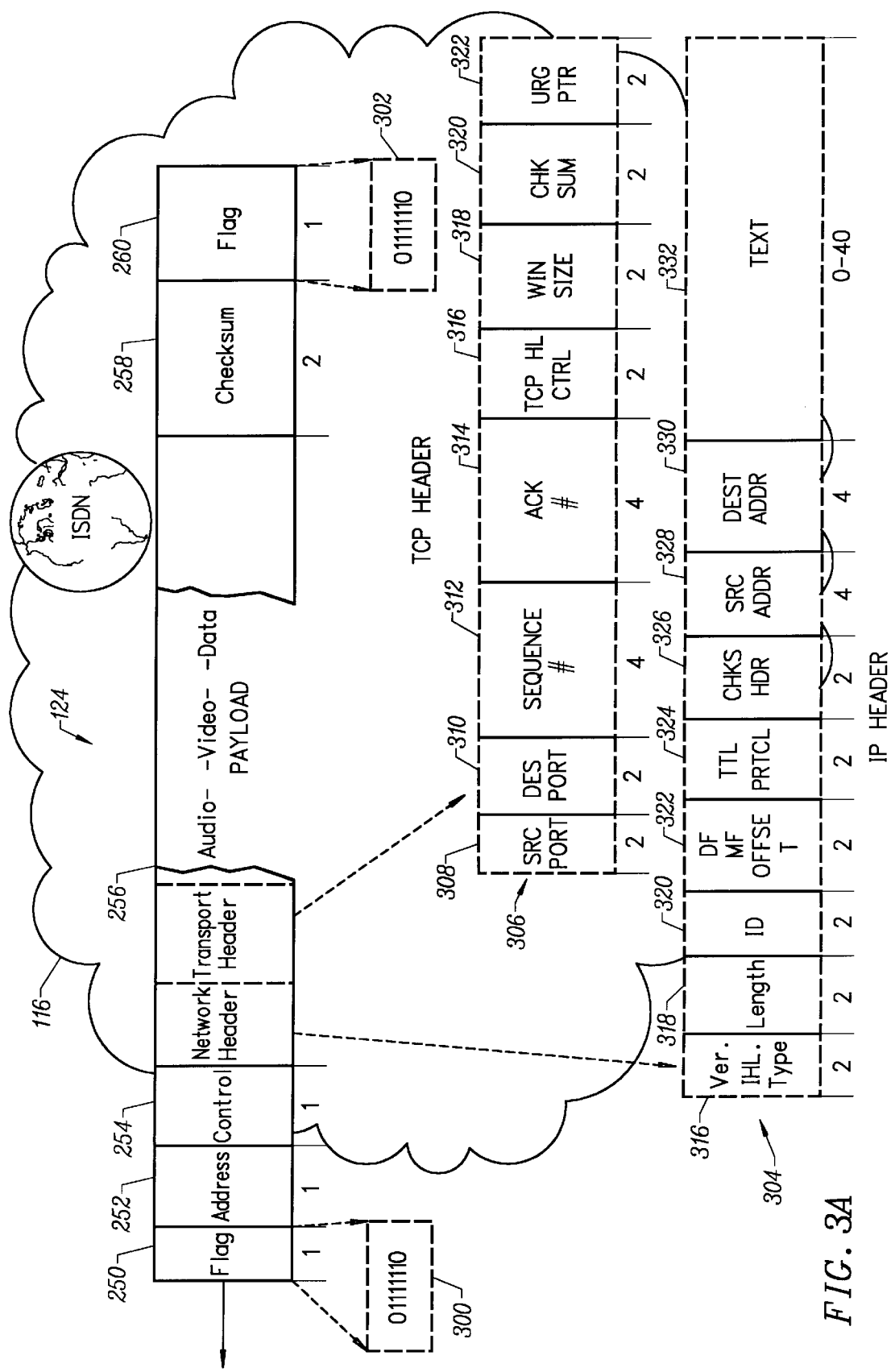
FIGS. 3A–C show in greater detail each of the packet types shown in FIG. 2B.
Figure 3B:
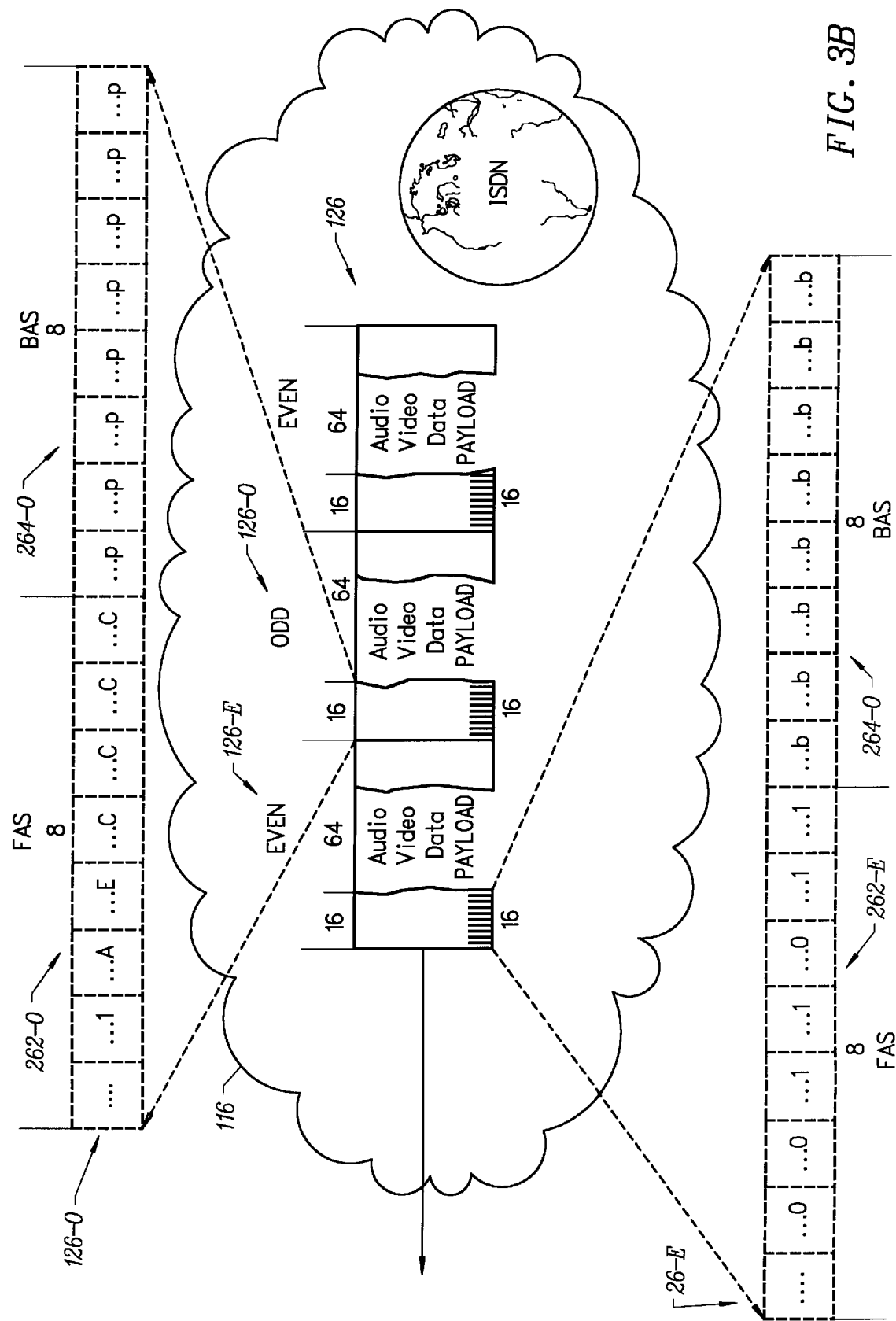
Figure 3C:
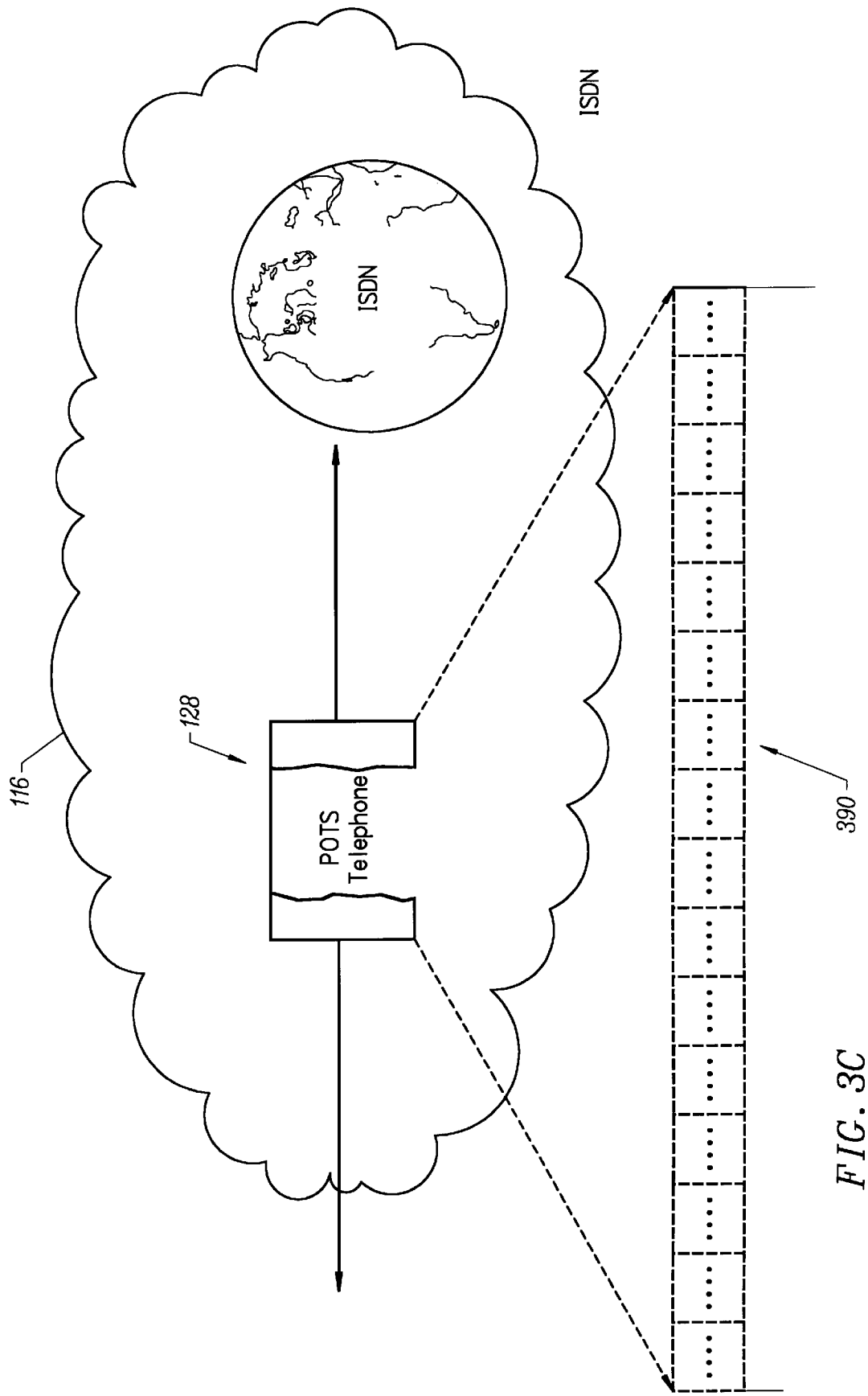

FIGS. 3A–C show in greater detail the DLL frame protocols shown in FIG. 2B. A detailed view of the HDLC DLL frame is shown in FIG. 3A. The binary 01111110 sequence 300 contained in the start flag 250 for the frame is shown. The binary 01111110 sequence 302 for the end of frame flag 260 is also shown. The payload portion 256 contains in addition to audio video and data, a NL header 304 and a TL header 306. Each of these headers are at least 20 bytes in length. Thus, the payload portion of each HDLC frame is accompanied by at least 46 bytes of header information corresponding to the DLL, NL, and TL headers. Thus, the frame identified at a data link layer as HDLC also contains headers for the network and transport layers. The DLL has the modest function of moving a frame/packet along a portion of its journey from one end of a wire to another. The NL by contrast has the more ambitious task of getting a frame/packet from a source all the way to a destination across many hops at intermediate routers along the way. The TL is concerned with transmission reliability, urgency and acknowledgment. This existence of the transport layer makes it possible for the transport service to be more reliable than the underlying network service. Lost packets and mangled data can be detected and compensated for by the TL.

In the example shown in FIG. 3A, the NL is implemented with an internet protocol (IP). The IP header 304 has three fields, 316 comprising the first two bytes of the header. These record the version number, the header length and the type of service expressed in terms of reliability and speed that is required for the frame. The next field, the length field 318 is two bytes in length and indicates the total length of everything in the datagram including both header and data. The next field the identification field 320 which is two bytes in length and allows the destination host to determine which datagram a newly arrived fragment belongs to. All the fragments of a datagram contain the same identification value. The next two bytes 322 contain three fields for controlling, recording and sequencing datagram fragmentation. The next two bytes, segment 324 contain the time to live and protocol fields. The time to live field is a counter used to limit packet lifetimes. The protocol field tells the network layer which transport process to give the packet to. Transport control protocol (TCP) is one possibility, but so are user datagram protocol (UDP) and some others. The number of protocols is global across the entire internet and is defined in RFC 1700. The next two byte field 326 is the header check sum field which verifies the header only and is useful for detecting errors generated by bad memory words inside a router. The next two fields 328–330 are each 4 bytes in length and contain respectively the source and destination addresses. These addresses are hierarchically laid out in order to allow for intelligent network routing. The final field which is optional is a text field 332 from 0–40 bytes in length.

Immediately following the network header 304 is a TL header 306 which, in the example shown, implements the transport control protocol (TCP). This header is also 20 bytes in length. The first 2 bytes comprises fields 308–310 for respectively the source port and the destination port. The source and destination port fields identify the local endpoints of the connection. Each host may decide for itself how to allocate its own ports numbered from 1–256. A port plus its hosts network layer address forms a unique address. The next two fields, 312–314 each 4 bytes in length are respectively the sequence number and acknowledgment number fields. These provide for the in order transmission and acknowledgment of packets. Every byte of data is numbered in a TCP stream. The next two bytes segment 316 comprises several control fields including a TCP header length field followed by a series of one bit flags for controlling the urgency, acknowledgment, synchronization and completion of transmission. The next 2 byte field 318 indicates the window size which tells how many bytes may be sent starting at the byte acknowledged. The next field 320, 2 bytes in length is the check sum field. It is provided for extreme reliability and check sums the header and data. The next field 322 also 2 bytes in length is a pseudo header. Thus because an HDLC frame contains DLL, NL, and TL headers there is a considerable overhead, e.g. headers and associated processing, associated with the transmission of payload in an HDLC format.

A remote bridge or router configuration can be achieved by coupling two IGBRs across a common ISDN backbone. If for example an IGBR were substituted for router 110 [see FIG. 4] then that IGBR and IGBR 108 would form a bridge between LAN 118 and LAN 114. In this case transparent bridging between LANs would be achieved by simply taking the packet from one LAN including a MAC address, Network Header, Transport Header and all remaining packet portions and wrapping it into an HDLC frame and passing it across the ISDN 116 backbone. The receiving IGBR would after determining the incoming frame was HDLC simply remove the HDLC header and pass the packet unchanged from its original form onto the receiving LAN.

FIG. 3B shows the 80 byte frame sequence specified in the ITU H.320 and the accompanying ITU H.221 standard for the transmission of audio, video and data. In contrast to the HDLC frame shown in FIG. 3A this frame protocol has none of the overhead associated with the network or transport layer headers that are found in an HDLC frame. Thus, audio, video and data may be transmitted in a frame, a higher percentage of payload content than can be achieved with an HDLC frame. This simplistic frame format is feasible because (a) it takes advantage of two features of point-point-point networks and specifically ISDN, e.g. reliability of transmission, point-to-point, synchronous nature of transmission, and out-of-band control signaling and (b) it is applicable to only a specific application: audio, video, and data conferencing. The out-of-band control channel (e.g., the Dchannel or signaling system 7 (SS7)) allows the source and destination to be identified during or before the call setup.

Each H.320 frame is 80 bytes in length. Frames are categorized in the sequence they are received as even and odd frames. 16 bits in the least significant bit position of the first 16 bytes of each 80 byte frame are devoted to frame identification, frame reliability, and error correction. The details of this 16 bit header are set forth in ITU-T specification H.221 entitled *"Line transmission of non-telephone signals frame structure for a 64–1920 k bit forward/s channel in audio visual teleservices"* published August 1995.

FIG. 3B shows an H.320 frame sequence consisting an even frame 126-E and an odd frame 126-O. Each of these frames is 80 bytes in length. The first 16 bytes of the even frame 126-E and specifically the least significant bits (LSB) of each of the first 16 bytes is shown on the lower half of FIG. 3B. The first 16 LSBs include a frame alignment sequence (FAS) 262-E and a bit-rate allocation signal (BAS) 264-O. On the upper portion of FIG. 3B is shown the FAS and BAS headers 262-O and 264-O for the odd frame 126-O. Note that the FAS and BAS header only exist in the least significant bit position of the first 16 bytes of each frame. The remaining bytes of the frame including the first 7 bits of the first 16 bytes are dedicated audio, video or data payload. Thus, only 2 bytes out of 80 or 2.5% is devoted to header information while the remaining 97.5% of each frame is devoted to payload. This is in contrast to the HDLC frame where payload may consume as little as 37% of the total bytes of frame, including the network and transport layer headers. The FAS allows for a frame recognition and comprises the binary sequence 00110111 found in bit positions 16, 24, 32, 40, 48, 56, 64, of the even frame 126-E and bit position 16 of the odd frame 126-O. No bit stuffing is called for in the H.221 protocol, therefore, payload data bits may emulate the FAS bits. Bit positions 40, 48, 56, and 64 of the odd frame 126-O contain a 4 bit cyclic redundancy check (CRC4) to provide end to end quality monitoring of the connection. Bit positions 72, 80, 88, 96, 104, 112, 120, and 128 of both the even frame 126-E and the odd frame 126-O are devoted to the BAS sequence. In the BAS sequence an eight bit code in the above mentioned bit positions in the even frame 126-E is complimented by eight error correction bits found in the above-mentioned bit positions of the odd frame 126-O . This implements a (16,8) double error correcting code. These bits are transmitted in an order so as to avoid emulation of the frame alignment word.

FIG. 3C shows details of frame 128 [see FIG. 1] a POTS frame which has no pre-defined length. Rather it is thought of as occupying one TDM channel on a single point-to-point line. One bit of each 8 bit sequence 390 may optionally be devoted to signaling information depending on the line provisioning. However, the most common case is to have all 8 bits to represent an audio sample. Unlike HDLC or H.320 frames POTS communication has no DLL, NL, or TL headers. The integrity of POTS traffic is therefore only as reliable as the integrity of the underlying digital carrier, which in the example shown is ISDN.

Hardware

Figure 4:
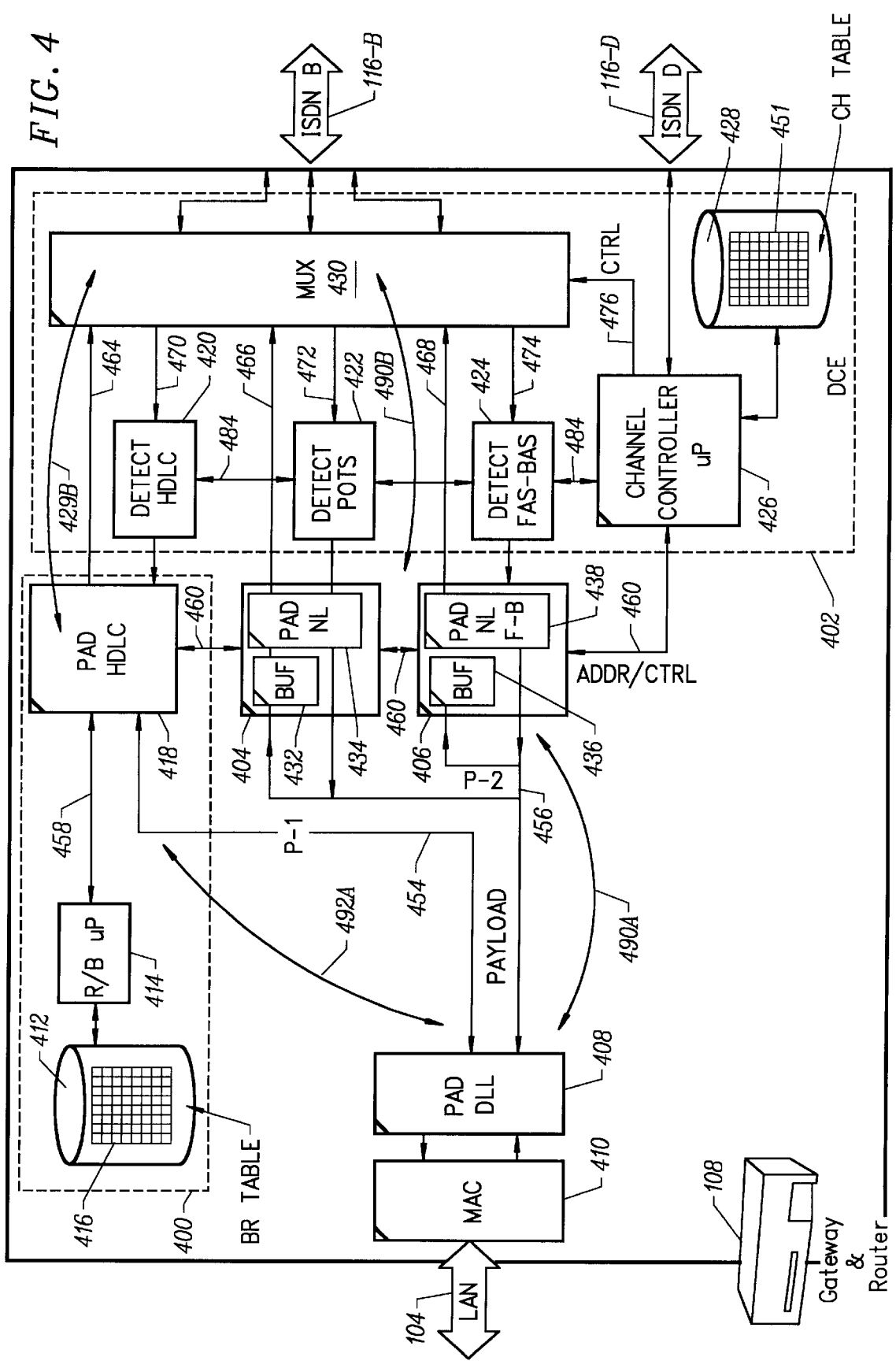
FIG. 4 is a hardware block diagram of the integrated gateway and router shown in FIG. 1.

FIG. 4 shows an embodiment of the hardware associated with the integrated gateway bridge router 108 [see FIG. 1]. The gateway bridge router includes a medium access control (MAC) controller 410 and a DLL packet assembler and disassembler (PAD) 408, a bridge/router 400, a POTS gateway 404, an H.320 gateway 406 and a detection module 402. The bridge/router 400 includes an HDLC PAD 418, a bridge router controller 414 and a memory 412 which includes a bridge and router table 416. The POTS gateway 404 includes an anti-jitter buffer 432 and a network layer pad 434. The H.320 gateway 406 includes an anti-jitter buffer 436 and a network layer and FAS/BAS pad 438. The detection module 402 includes MUX 430, detection unit 422–424, channel controller 426 and memory 428 which memory includes a session table 451.

MAC controller 410 is connected to LAN 114 [see FIG. 1]. DLL pad 408 is connected to MAC controller 410. A port one signal line 454 connects the DLL pad 408 to the HDLC pad 418 within bridge/router 400. A port two signal line 456 connects the DLL pad 408 to both the POTS gateway 404 and the H.320 gateway 406. The channel controller 426 is connected via address and control line 460 to HDLC pad 418 and gateways 404–406. Channel controller 426 is also connected via signal 484 to the bridge/router 400, and to each of the gateways 404–406. The channel controller is also connected via control line 476 to MUX 430. The channel controller is connected to the ISDN-D channel 116-D which contains the signaling and control information for the ISDN-B channel 116-B. The channel controller 426 is also connected to memory 428.

Within bridge/router 400, the bridge router controller 414 is connected to memory 412. The bridge controller is also connected via signal line 458 to the HDLC pad 418. HDLC Pad 418 passes outbound ISDN-B from port one line 454 to MUX 430 via signal line 464. HDLC pad 418 receives inbound ISDN-B traffic via HDLC detection unit 420 which is connected to MUX 430 via signal line 470.

POTS gateway 404 receives outbound ISDN traffic via port two signal line 456 which is connected to anti-jitter buffer 432 of the POTS gateway. The anti-jitter buffer 432 is connected to the network layer pad 434. The network layer pad passes outbound ISDN traffic via signal line 466 to MUX 430. Inbound ISDN POTS traffic passes to POTS gateway 404 and specifically network layer pad 434 from POTS detection unit 422. POTS detection unit 422 is connected via signal line 472 to MUX 430. Inbound ISDN traffic is passed from pad 434 directly to data line 456. No anti-jitter buffering is required since the inbound traffic comes off of a synchronized ISDN line.

H.320 gateway 406 receives outbound ISDN traffic over port signal line 456 at anti-jitter buffer 436. Anti-jitter buffer 436 is direct connected to network layer and FAS/BAS pad 438. Outbound ISDN traffic passes via signal 468 line from the FAS/BAS pad to MUX 430. Inbound ISDN H.320 traffic is received by the H.320 gateway at the FAS/BAS pad from H.320 detection unit 424. Detection unit 424 is connected via signal line 474 to MUX 430. MUX 430 is connected to ISDN-B channel(s) 116-B.

LAN to IGBR Traffic

In operation, incoming LAN 114 packets are received by the IGBR 108 at the MAC controller 410. The MAC controller compares the packets DLL destination address 204 [see FIG. 2A] with its own identification. If the destination address matches the address of the MAC 410 the packet is accepted. The MAC controller verifies the integrity of an accepted packet by independently computing check sum and comparing this computed check sum to the check sum field 212 [see FIG. 2A] of the DLL header. The packet is then passed to the DLL pad 408 for further processing. The data link layer pad determines which of 256 possible ports the payload 216 should be sent to on the basis of a port identifier contained within the transport header within the payload portion 216 [see FIG. 2A] of the incoming packet. In the example shown, there are two ports, accessed via signal lines 454 and 456. All remaining portions other than the payload of the incoming packet are discarded by the DLL pad. DLL Pad 408 thus determines whether the payload will proceed through the bridge/router 400 along the overall path represented by arrows 492A–B, or to the POTS and H.320 gateways 404–406 along the path represented generally by arrows 490A–B.

Packets passing from LAN 114 via port one along signal line 454 are received at HDLC pad 418. The HDLC pad 418 copies the network layer header and passes this header (router function) and or MAC address (bridge function) via signal line 458 to the router/bridge controller 414.

The bridge/router controller performs as a bridge by comparing the MAC address to MAC entries in a bridge/table and passing those packets to LAN 114 which have a MAC address corresponding to a MAC address on LAN 114 recorded in the bridge/router table. Packets whose MAC address do not correspond to an entry in the table are rejected. Rejection is implemented when a reject signal is passed from router/bridge controller 414 to HDLC pad 418, causing further processing of the packet to be terminated.

Alternately, if a routing function is being performed, the network layer destination header may be rewritten by router/bridge controller 414 on the basis of an entry/path in bridge/router table 416 as determined by controller 414. This updated routing information, in the form of a revised network destination address, is sent over signal line 458 from the bridge/router controller 414 to the HDLC pad 418, and is written into the source address field 328 within the network header 304 within the payload 256 of the HDLC frame 124 [see FIG. 3A]. The HDLC pad 418 then performs anti-emulation processing in the form of bit or byte stuffing on the payload 124 to assure that the HDLC flag will not be emulated by any bytes of the payload. The HDLC pad then computes the payload check sum and makes a corresponding entry in field 258 [see FIG. 3A] of the HDLC DLL header. The remaining portions of the HDLC frame specifically flag 250, address 252, control 254, and flag 256, are then added to the payload 256 and check sum 258. The outbound HDLC packet is then sent via signal line 264 to MUX 430. The destination address is passed from HDLC pad 418 via signal line 460 to channel controller 426. Channel controller 426, based on entries within sessions/channel table 432, determines which of the outgoing channels of the ISDN-B line 116-B the HDLC frame should be placed on and sends a corresponding control signal via signal line 476 to MUX 430. This results in the HDLC frame being placed on the appropriate channel within the ISDN-B signal line.

Incoming LAN traffic destined for port two may represent either POTS traffic or H.323 televideo conference traffic. By default, incoming port two LAN traffic is passed from DLL pad 408 via signal line 456 to H.320 gateway 406. This is the case even if the traffic is POTS based. Only when on the basis of reverse communication from ISDN to LAN is it shown that the traffic is POTS traffic, will gateway processing be passed to the POTS gateway 404. This handoff will be described in greater detail in connection with FIG. 6A. Incoming port two LAN traffic is passed to anti-jitter buffer 436 of the H.323-320 gateway. This buffer allows unsynchronized LAN traffic to be synchronized before being placed on the synchronous ISDN-B channel. The output of the anti-jitter buffer 436 is connected to the network layer and FAS/BAS pad 438. Pad 438 strips network layer and transport layer headers from the incoming payload, and passes these via address and control signal line 460 to the channel controller 426. The channel controller utilizing channel/session table 432 determines which of the outgoing ISDN-B channels to place the traffic on and records the network and transport layer header information in the session table entry associated with the selected channel. Additionally, the FAS/BAS pad 438 fragments the payload into 80 byte segments, and calculates and inserts the FAS/BAS header. The outgoing FAS/BAS frame are passed via signal line 468 to MUX 430. MUX 430, under the control of channel controller 426 places the outgoing H.320 frames onto the appropriate ISDN-B channel 116-B. Note that initially POTS traffic receives identical treatment, i.e., up to and including the addition of a FAS/BAS header. The FAS/BAS header constitutes such a small portion of the POTS frame as to not significantly reduce the intelligibility of the POTS signal at the receiving point, e.g., telephone 106 [see FIG. 1]. The insertion of this FAS/BAS header into the POTS traffic continues until return traffic analysis indicates that a POTS rather than an H.320 session is being implemented, in which case incoming payload across signal line 456 is processed by POTS gateway 404 instead of H.320 gateway 406. This process will be described in greater detail in connection with FIG. 6A.

ISDN to IGBR Traffic

Incoming ISDN-B frames must be distinguished at the data link layer level since there is no uniform feature found in HDLC, POTS and H.320 frames. H.320 frames have a DLL minimal header, a fixed length, and do not implement anti-emulation or have a NL or TL header, HDLC frames are of variable length, have substantial headers at the DLL, NL, and TL levels, and implement anti-emulation. POTS sessions are not framed, do not have a header, and do not involve emulation. The circuitry for differentiating incoming data link layer frame types will be shown in this and the following FIGS. 5A–C. As will be obvious to those skilled in the art, the circuitry can be implemented in hardware or software for any number of different frame types including those shown in the current embodiment. Detection may be accomplished by one or more of the detection processes, by consensus, by default, serially, or in parallel. Processing may be implemented on one or more microprocessors, implementing processes serially or in parallel, in any one of a number of linear or hierarchical formats, without departing from the teachings of the invention.

In the embodiment shown, detection among three different frame types is accomplished by parallel circuitry. Incoming ISDN-B frames from a new session are passed from MUX 430 to each of the incoming ISDN signal lines 470-474 until such time as a determination has been made as to which of incoming signal lines 470-474 is appropriate to the frame type present on the ISDN-B channel being processed. In the embodiment shown, the categorization of an unidentified incoming ISDN frame is made by frame detection units 420-424 operating in unison. Detection unit 420, which will be discussed in greater detail in connection with FIG. 5A, checks the incoming frame to see if it is an HDLC frame. Detection unit 422 [see FIG. 5D] embodies method and apparatus for detecting an incoming POTS frame. Detection unit 424 [see FIG. 5C] implements apparatus and method for detecting incoming H.320 frames with a corresponding FAS/BAS header. An incoming call session will be subject to all three detection processes until such time as it is categorized by one of the detection units. If the HDLC detection unit sends a signal via signal line 484 to channel controller 426 indicating that the incoming frame is an HDLC frame, then the channel controller terminates further detection processing of that channel by detection units 422 and 424 by reconfiguring MUX 430 so as to connect that incoming channel to signal line 470 only. Signal line 470 is then passed directly to HDLC pad 418 for the remainder of the session without involving any further HDLC detection. Alternately, if POTS detection unit 422 sends a signal to channel controller 426 via signal line 484 indicating the incoming frame is a POTS frame, then the channel controller 426 disables further detection activity for that channel by either detection unit 420 or 424 by reconfiguring MUX 430 so that incoming frames from that channel are only passed via signal line 472 directly to the network layer pad 434 of POTS gateway 404. Additionally, the channel controller 426 disables processing by H.323 gateway 406 of the return traffic from the POTS session, and instead enables POTS gateway 404 to handle the return POTS traffic.

Alternately, if a decision is reached by detection unit 424 that the incoming frames from the new session are H.320 frames, then this indication is sent via signal line 484 to channel controller 426. In response, the channel controller 426 disables further detection activity by either detection units 420 or 422 for frames associated with that channel by reconfiguring MUX 430 so as to send frames from that channel during that session only via signal line 474 directly to pad 438 within H.323-H.320 gateway 406.

An incoming ISDN-B HDLC frames is subject to several processes by HDLC pad 418. The first of these is anti-emulation, in which, on either a bit or byte level, the emulation bit or bytes are removed from the payload 256 [see FIG. 3A] of the incoming HDLC frame. Next, the destination address 330 which is part of the NL header 304, is passed via signal line 458 to the bridge router controller 414. If the controller is performing as a bridge, it can either accept or reject the incoming frame on the basis of an entry within bridge router table 416. If the frame is rejected, a reject signal is sent via signal line 458 to the HDLC pad 418, causing it to reject the incoming frame. Alternately, if the bridge router controller 414 is performing as a router, it can, on the basis of an entry in the router table 416, identify a best route and rewrite the NL destination address 330 on the basis of that best route. Next, the HDLC pad removes all vestiges of the HDLC frame, including flag, address, control, check sum, and flag fields, respectively 250-254, 258-260. Finally, the HDLC pad passes via the port one signal line 454, the payload to the DLL pad 408. The data link layer pad remaps the network layer source and destination address into a DLL source and destination address, and implements the 802.3 (or any other DLL/MAC protocol as relevent to the particular packed-switched network) packet protocol by computing a check sum and adding preamble, start, destination address, source address, length, and check sum fields respectively 200-208 and 212 to the payload portion 216 of the LAN packet 122 [see FIG. 2A]. This packet is passed to MAC 410 which handles the placement of this packet onto the LAN 114.

For incoming POTS frames, processing is handled within POTS gateway 404 by network layer pad 434. This pad receives via signal line 460 from channel controller 426 both the NL and TL information for this channel. Alternately, NL and TL information is obtained in-band, by the POTS user dialing dual tone multiple frequency (DTMF) digits which correspond to the destination address. This information is contained in the channel/session table 432. These headers are appended to the POTS data. This data with the network and transport layer header is passed as payload via the port two signal line 456 to the DLL pad 408. The DLL pad remaps the source and destination address at the network layer into a data link layer source and destination address, and performs the additional packetization functions including the attachment of the preamble, start, destination address, source address, length and check sum fields respectively 200-208 and 212 [see FIG. 2A] to the payload portion 216 of the outgoing LAN packet 122. This packet is passed to MAC controller 410 for placement on LAN 114.

Incoming H.320 traffic is passed from ISDN-B via signal line 474 directly to network layer and FAS/BAS pad 438. This pad additionally checks the FAS BAS header by independently calculating CRC and error correction code and compares the calculated values with the actual values found in the least significant bits of the FAS BAS header of the odd and even 80 byte frames. Packets which pass these tests have the FAS/BAS header removed, and a NL and TL header attached as part of the payload. The network and transport layer headers are provided to H.320 pad 438 via signal line 416 by channel controller 426. The channel controller obtains this information from the channel/session table 432, which holds the network and transport layer headers for this channel. The payload is passed from pad 438 via port two signal line 456 to the DLL pad 408. The DLL pad, as discussed above, implements the data link layer protocol appropriate to the LAN on which the packet will be placed. In the example shown in FIG. 2A, pad 408 implements an 802.3 data link layer packet protocol. This involves, as discussed above, adding the preamble, start, destination address, source address, length and check sum fields, respectively 200-208 and 212, to the payload 216 [see FIG. 2A]. The resulting packet 122 is passed to MAC 410. MAC 410 handles the placement of this packet onto LAN 114.

DLL Frame Detection Circuits

Figure 5A:
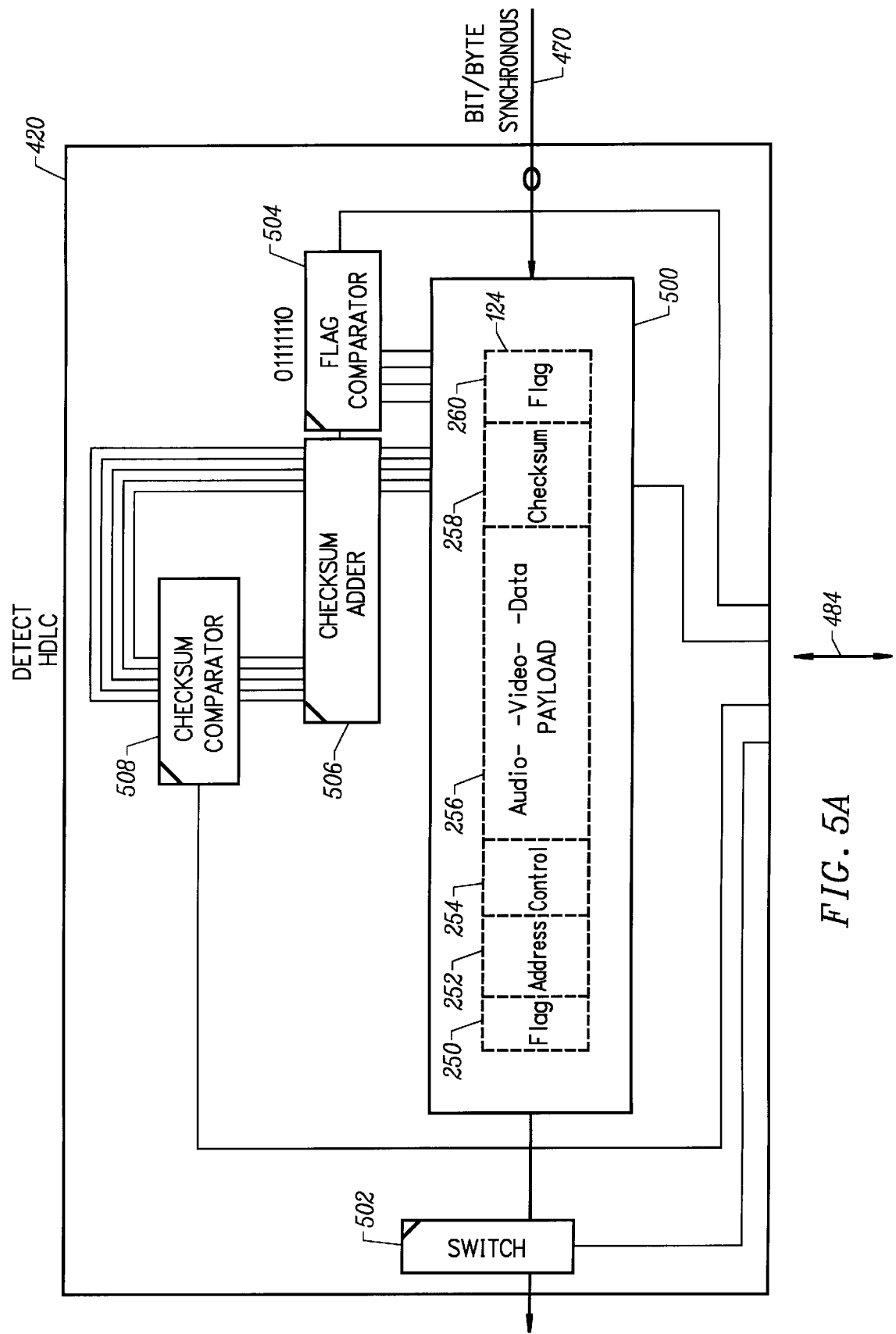
FIGS. 5A–C are detailed hardware block diagrams for the packet detection circuits shown in FIG. 4.

FIG. 5A shows a hardware embodiment of the HDLC detection unit 420 [see FIG. 4]. As will be obvious to those skilled in the art, this circuitry can be implemented in either software or hardware. The circuit 420 includes a shift register 500, a switch 502, a flag comparator 504, a check sum adder 506 and a check sum comparator 508. The shift register 500 is connected to the signal line 470 from MUX 430. [See FIG. 4]. The output of the switch is connected to an input of the HDLC pad 418. [See FIG. 4]. The shift register 500, switch 502, flag comparator 504, check sum adder 506, and check sum comparator 508 are all connected to channel controller 426, via signal line 484 [see FIG. 4].

In operation, incoming data over signal line 470 is passed into the shift register 500. That data, depending on whether the signal line 470 is bit or byte synchronous, is shifted left 1 bit/byte at a time until flag comparator 504 detects a the flag sequence 01111110 within the incoming data stream. Once such a sequence is detected, data is shifted left while the check sum adder 506 performs a check sum function on the incoming data. That function continues until flag comparator 504 again indicates that a flag sequence has been detected within the data stream. This indicates, tentatively, an end of a frame. Next, the 2 byte sequence immediately preceding the flag sequence is input to check sum comparator 508 and compared with the check sum calculated by check sum adder 506. In the event there is a match, the incoming data stream is an HDLC data stream, and a control signal indicating such detection and recognition is passed via signal line 484 to the channel controller 426. Channel controller 426 may be implementing an algorithm which requires that the detection unit 420 detect more than one HDLC frame before the incoming data will be categorized as HDLC. When channel controller 426 has determined that sufficient incoming data on a channel has been analyzed and categorized as HDLC, then subsequent data for that session is passed to HDLC pad 418 by enabling switch 502. Switch 502 connects the shift register output to the HDLC pad 418 [see FIG. 4]. The channel controller also reconfigures MUX 430 to avoid further processing during this session of this channel by detection units 422–424. During the remainder of a call session the detection unit continues to perform as a synchronizer determining the start and end of each frame and passing each frame to the HDLC pad. As frames are received by the HDLC pad 418, the HDLC pad passes a network and transport layer address 460 to the channel controller 426. These addresses are written into the channel/session table 432 and are associated with data coming in on the specific channel until such a session is terminated. When a new session on a specific channel resumes, all detectors, including the HDLC detector are reenabled by controller 426 via signal line 484.

Figure 5B:
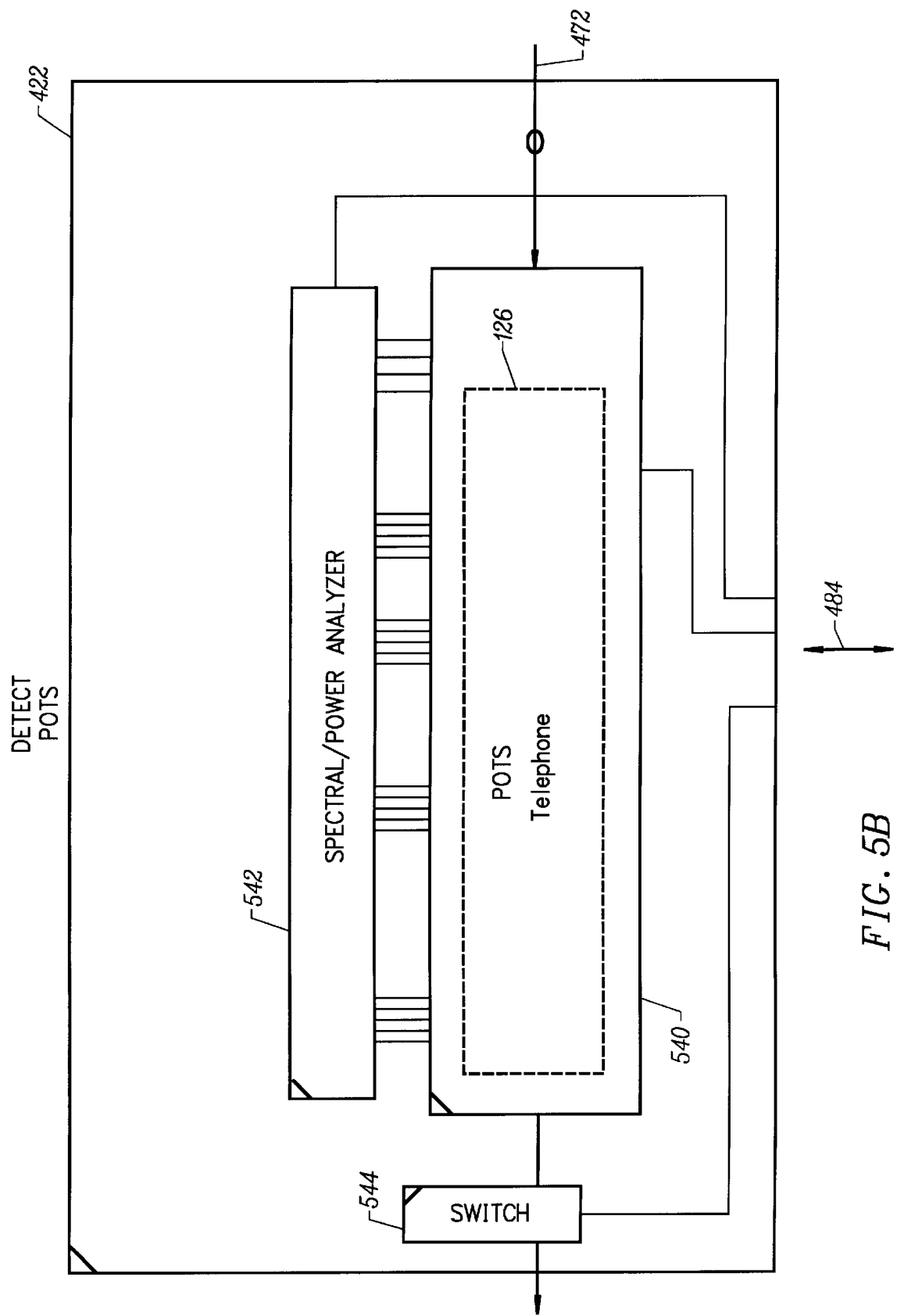

FIG. 5B shows a detailed view of an hardware implementation of POTS detection unit 422 [see FIG. 4]. Hardware components include a shift register 540, a spectral or power analyzer 542 and a switch 544. Incoming ISDN-B traffic from a specific channel is passed via signal line 472 to sample buffer 540. That data is analyzed by spectral/power analyzer 542. When sufficient data has been analyzed to indicate either that the spectral components correspond to a POTS session, or that the power level of the incoming data corresponds to a POTS session, then spectral/power analyzer 542 sends a POTS detection signal via signal line 484 to channel controller 426. The channel controller 426 then reconfigures MUX 430 to present all subsequent ISDN-B traffic for that channel during that session to signal line 472. Additionally, the channel controller sends a signal via signal line 484 to enable switch 544 to send POTS traffic associated with that channel on signal line 472 to POTS NL pad 434 [see FIG. 4]. The channel controller disables further spectral/power analysis for traffic associated with that channel. The channel controller also reconfigures MUX 430 to avoid further processing during this session of this channel by detection units 420 and 424. Additionally, channel controller 426 will determine which channel is associated with the return POTS traffic from the LAN side. If that traffic is currently being processed in the H.323 H.320 gateway 406, then return channel traffic will be sent instead via port 2 to POTS gateway 404. This assures symmetrical processing of duplex POTS traffic.

Figure 5C:
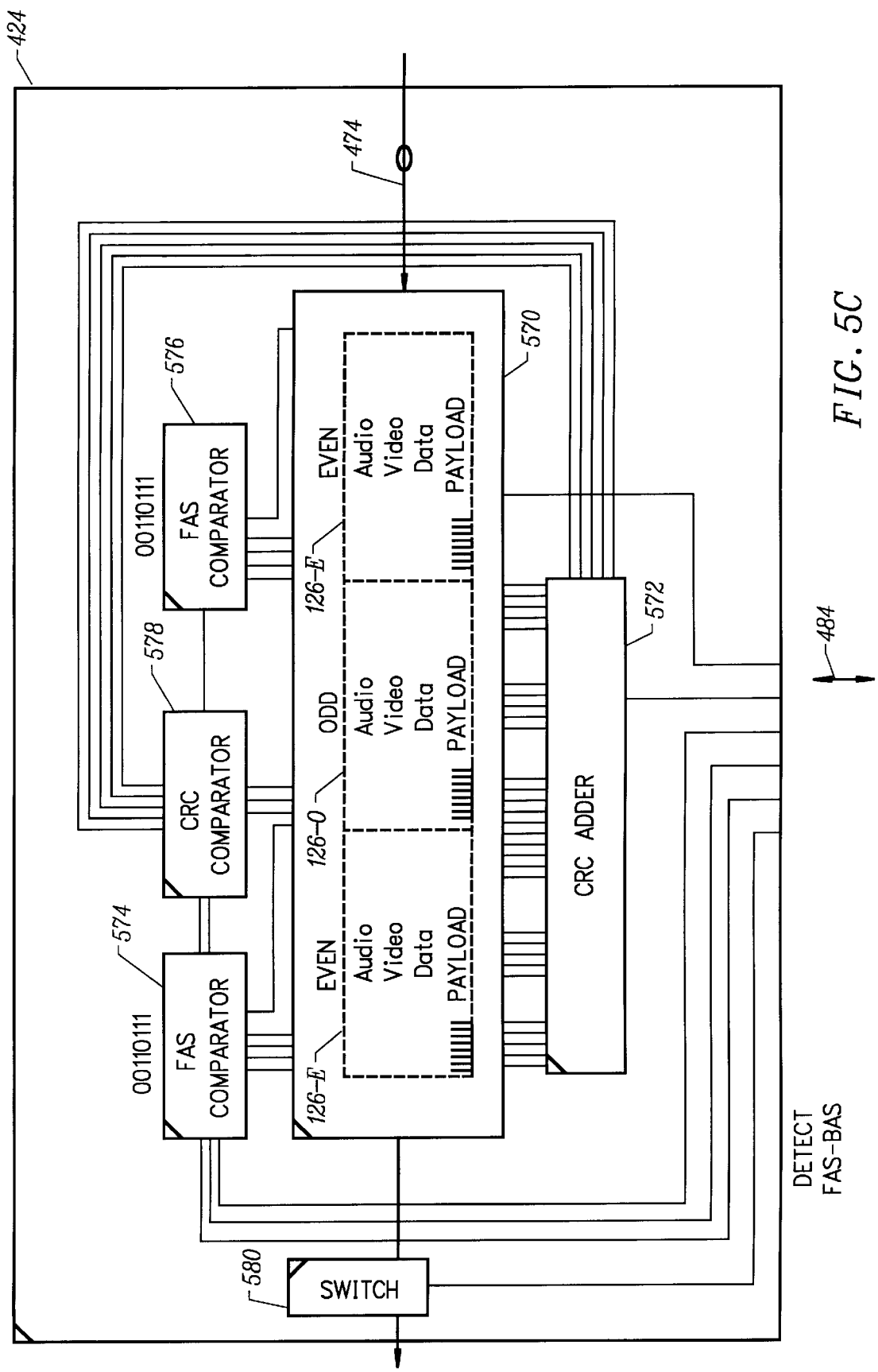

FIG. 5C shows a detailed hardware embodiment for the H.320 detection unit 424 [see FIG. 4]. In the hardware embodiment shown, a shift register 570, a CRC adder 572, a FAS comparator 574, a FAS comparator 576, a CRC comparator 578 and a switch 580 are shown. Signal line 474 is connected to shift register 570. The output of switch 580 is connected to an input of NL pad 438 [see FIG. 4]. Signal line 484 from the channel controller 426 [see FIG. 4] is shown with individual connections to each of the above-mentioned hardware components.

In operation, an incoming data stream from signal line 474 is bit shifted until both FAS comparators 574 and 576 detect at an interval of 160 bytes an identical FAS sequence, i.e., 00110111, within the incoming data stream 474. If this condition is indicated, then CRC adder 572 independently calculates the CRC for both the prospective even frame 126-E and odd frame 126-O, and compares this calculated CRC with the potential CRC contained within the least significant bit position of the 85th through 88th byte of the 160 bytes of data being processed. If the calculated CRC agrees with the CRC contained in the prospective FAS/BAS frame header, then a signal is sent via signal line 484 to the channel controller 426 indicating that the incoming data stream on signal line 474 is implementing an H.320 DLL protocol. If this determination is reached, then channel controller 426 reconfigures MUX 430 to avoid further processing during this session of this channel by detection units 420–422. Additionally, channel controller 426 enables switch 502 to passes further session traffic from signal line 474 to NL and FAS/BAS pad 438 within H.320/323 gateway 406 [see FIG. 4]. During the remainder of a call session the detection unit continues to perform as a synchronizer determining the start and end of each frame and passing each frame to the FAS/BAS pad.

Figure 6B:
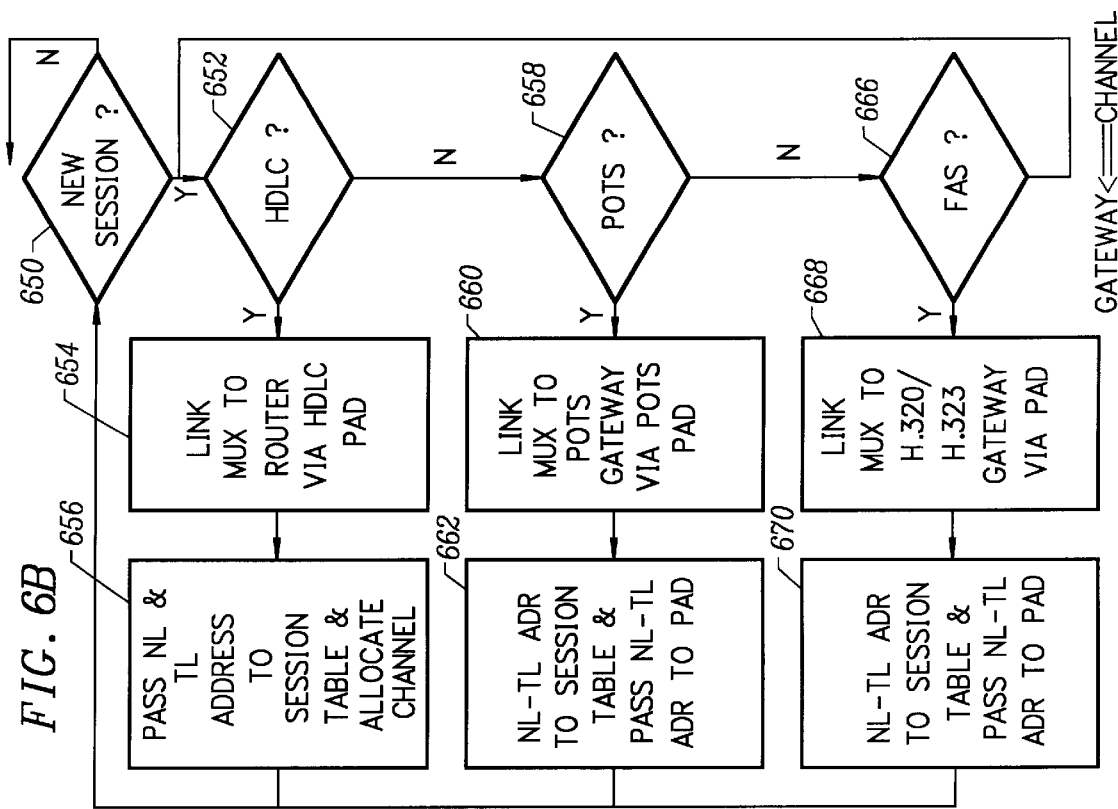
FIGS. 6A–B are process flow diagrams for the integrated gateway/router.
Figure 6A:
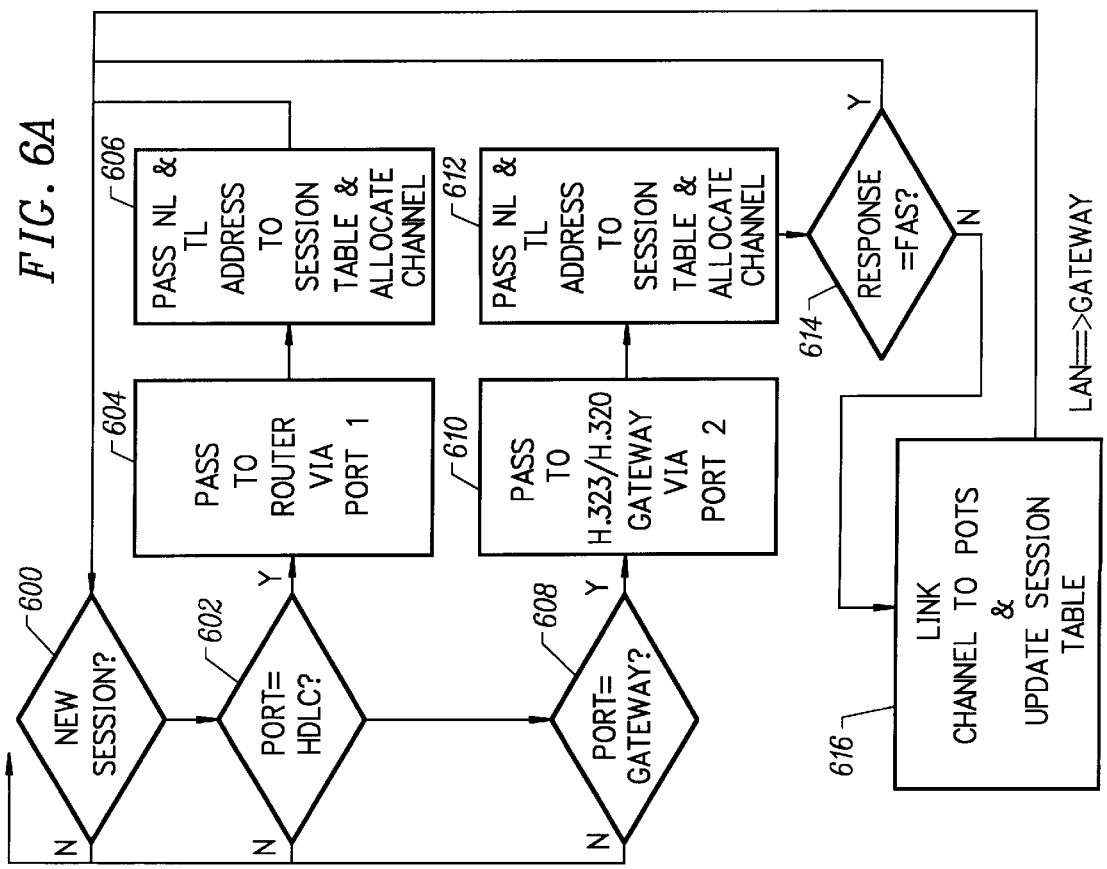

FIGS. 6A–B show the process flow associated with, respectively, incoming traffic from LAN 114 and incoming traffic from ISDN 116 [See FIG. 4].

LAN to IGBR Traffic Processing

If an H.323 call originates on the LAN side, then the originating terminal communicates directly with the IGBR using the gateway's IP address including a first distinct port address for remote access bridge router traffic and second distinct port address for remote access gateway traffic following either a POTS or H.323 protocol. Processing of a new session incoming from LAN 114 to the IGBR 108 begins with decision process 600. In decision process 600, a new session determination is made. If that determination is in the affirmative, control is passed to decision process 602. In decision process 602, a determination is made as to whether the incoming LAN traffic is destined for a port associated with traffic which on the ISDN-B channel will be framed at a data link layer as HDLC traffic. If this determination is in the affirmative, then control is passed to process 604. In process 604, the payload portion of the incoming packet, complete with network and transport layer information, is passed to the router. Control is then passed to process 606. In process 606, the bridge/router 400 [see FIG. 4] passes the network layer and transport layer address to the channel controller 426. The channel controller 426 writes this information into the channel/session table 432 and allocates a specific channel to the HDLC session. Control then returns to decision process 600.

If, alternately, in decision process 602, a negative determination is reached, i.e., that the incoming traffic is not destined for a port associated with bridge/router traffic, i.e. port 1, then control passes to decision process 608. In decision process 608, a determination is made as to whether the incoming LAN traffic is destined for a port associated with the POT or H.320-H.323 gateway. If this determination is in the affirmative, then control is passed to process 610. In process 610, the incoming payload portion, including the network and transport layer headers of the LAN traffic, is passed to the H.323/H.320 gateway via port two. Control is then passed to process 612. In process 612, the H.323/H.320 gateway passes the network layer and transport layer header address to the channel controller 426 [see FIG. 4]. The channel controller in turn writes the network layer and transport layer information to the session table 432, and allocates a channel on ISDN-B line for this traffic. Control is then passed to decision process 614. In decision process 614, the channel allocated for the return traffic associated with this session is determined by channel controller 426. The incoming ISDN traffic from this channel to the gateway is monitored via detection units 420–424. If that traffic is determined to be H.320 traffic, then control returns to decision process 600. Alternately, if that return traffic is determined not to be H.320 traffic, then control passes to process 616. In process 616, channel controller 426 deallocates gateway 406 for the processing of the incoming LAN traffic associated with this session, and instead allocates POTS gateway 404 for the processing of this traffic. The session table 432 is also updated by controller 426 to reflect the allocation of the POTS gateway 404 to this session. Control then returns to decision process 600.

ISDN to IGBR Traffic Processing

Call setup procedures for a call originating on the ISDN side are specified in ITU Q.931. When a call is set up a physical Point-point-point link is established. Call setup involves a string of digits or tones being sent over either the D/B-channels. These digits or tones are translated by the channel controller 426 into a corresponding destination LAN address utilizing a lookup of the entries in the session/channel table 432 [see FIG. 4] or an external directory server. At the end of a call the B-channel allocated for the call is returned to a pool of available channels for the next call session.

FIG. 6B shows the processing associated with a session initiated on the ISDN D-channel 116-D [see FIG. 4]. When a call originates on the ISDN side, the device determines the type of the call by examining the received bits. Those bits can be either (i) H.221 framed, in which case the least significant bit of the first 8 bytes in a frame are used for frame alignment; (ii) HDLC-framed, in which case the beginning and end of a frame is marked by a well-defined bit pattern called the HDLC flag; or (iii) unframed, which normally occurs when the call is being made by a voice terminal on ISDN or POTS.

Processing begins at decision process 650 in which a new session determination is made. If this determination is in the affirmative, control passes to decision process 652. In decision process 652, a determination is made as to whether the incoming data link layer protocol is an HDLC protocol. If this determination is in the affirmative, then control is passed to process 654. In process 654, ISDN traffic for this session is linked via MUX 430 to bridge/router 400 via HDLC pad 418 [see FIG. 4]. Control is then passed to process 656. In process 656, the HDLC pad copies the network layer and transport layer header including any updates performed by bridge router controller 414 to the channel controller 426. This results in the allocation of a channel to this session, and the recordation of the network layer and transport layer information for this allocated channel. Control then returns to decision process 650.

If, alternately, in decision process 652, a determination in the negative is reached, i.e., that incoming frame is not at a data link layer defined as with an HDLC protocol, then control is passed to decision process 658. In decision process 658, a determination is made as to whether the incoming ISDN traffic is at a data link layer defined as POTS traffic. If that determination is in the affirmative, then control is passed to process 660. In process 660, MUX 430 is passed directly to the POTS gateway via POTS pad 434 [see FIG. 4]. Control is then passed to process 662. In process 662, channel controller 426 obtains via ISDN-D channel 116-D [see FIG. 4] the network layer and transport layer information associated with this POTS session. That information is written into the channel/session table 432 as an entry corresponding to the channel allocated for this session. The network layer and transport layer address is then passed by controller 426 to the POTS pad 434 [see FIG. 4]. The POTS pad, as discussed above, attaches this information to the POTS traffic incoming from the ISDN-D channel. Control then returns to decision process 650.

If, alternately, in decision process 658, a negative determination is reached, i.e., that incoming ISDN-B channel traffic is not following a POTS data link layer protocol, then control is passed to decision process 666. In decision process 666, a determination is made as to whether the data link layer protocol being implemented for the incoming ISDN session is H.320. If that determination is in the affirmative, then control is passed to process 668. In process 668, controller 426 links MUX 430 directly to gateway 406 and specifically H.320 pad 438 [see FIG. 4]. Control is then passed to process 670. In process 670, controller 426 writes the network and transport layer header information passed over ISDN-D line 116-D to the session/control table 432 as an entry associated with data channel. Additionally, controller 426 [see FIG. 4] passes the network and transport layer header received, via the ISDN-D line to the H.320/H.323 gateway 406, and specifically pad 438. Pad 438, as discussed above, appends these headers to the incoming ISDN traffic on this channel, and sends it, plus the incoming data, as payload via port 2 signal line 456 to the DLL pad 408 [see FIG. 4]. Control is then returned to decision process 650.

Figure 7A:
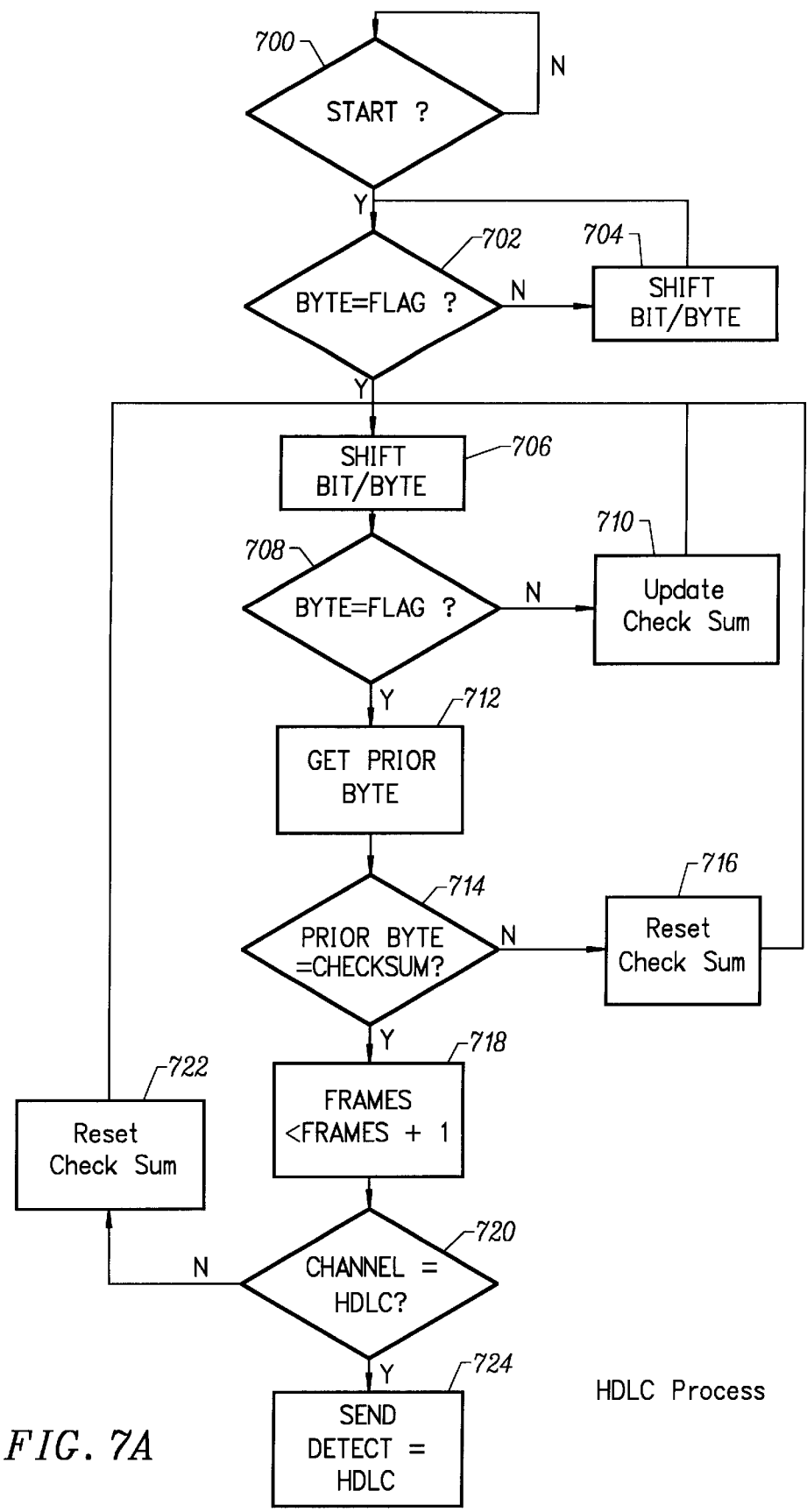
FIGS. 7A–C are detailed process flow diagrams of the frame identification processes shown in FIG. 6B.
Figure 7B:
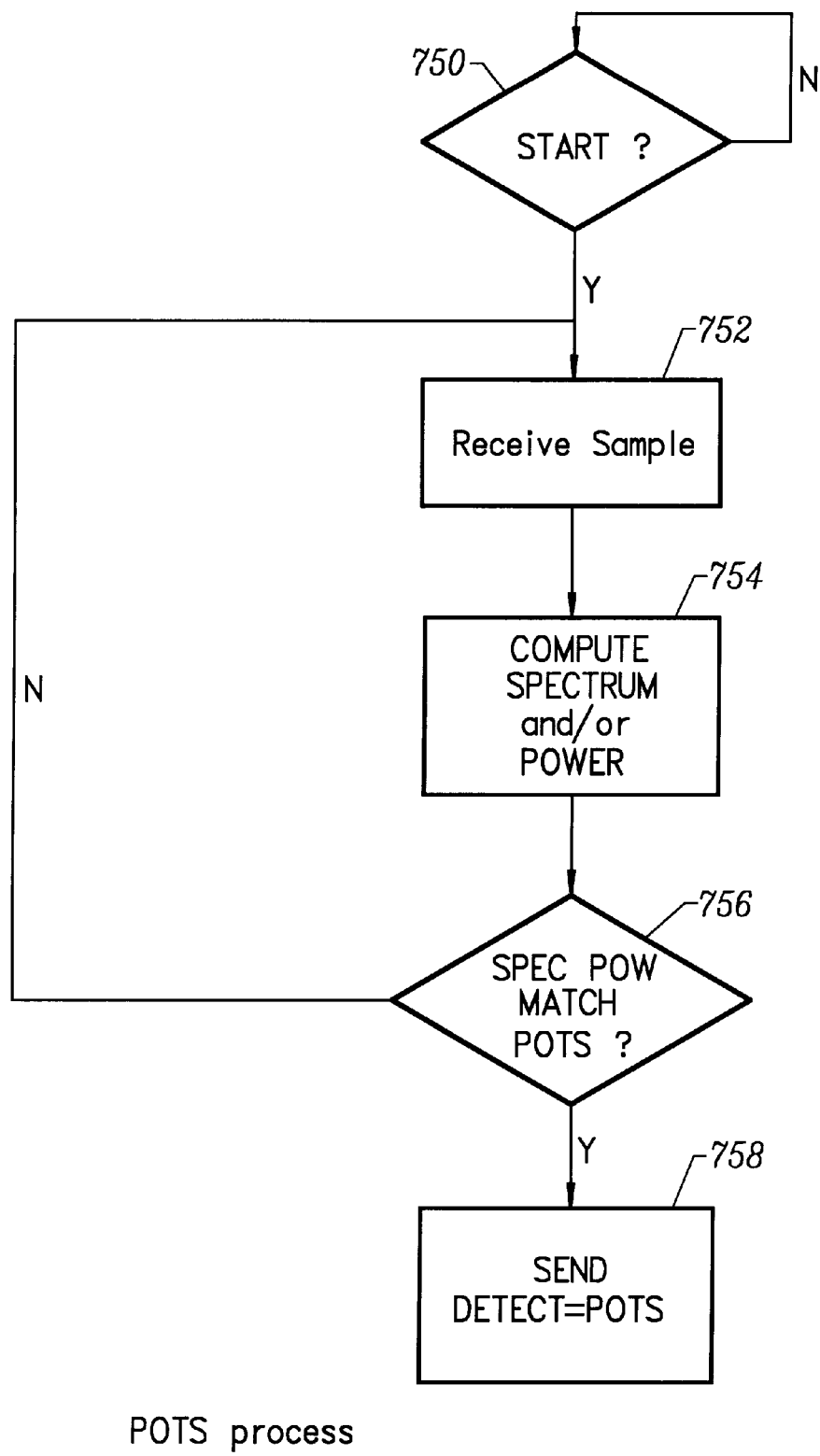
Figure 7C:
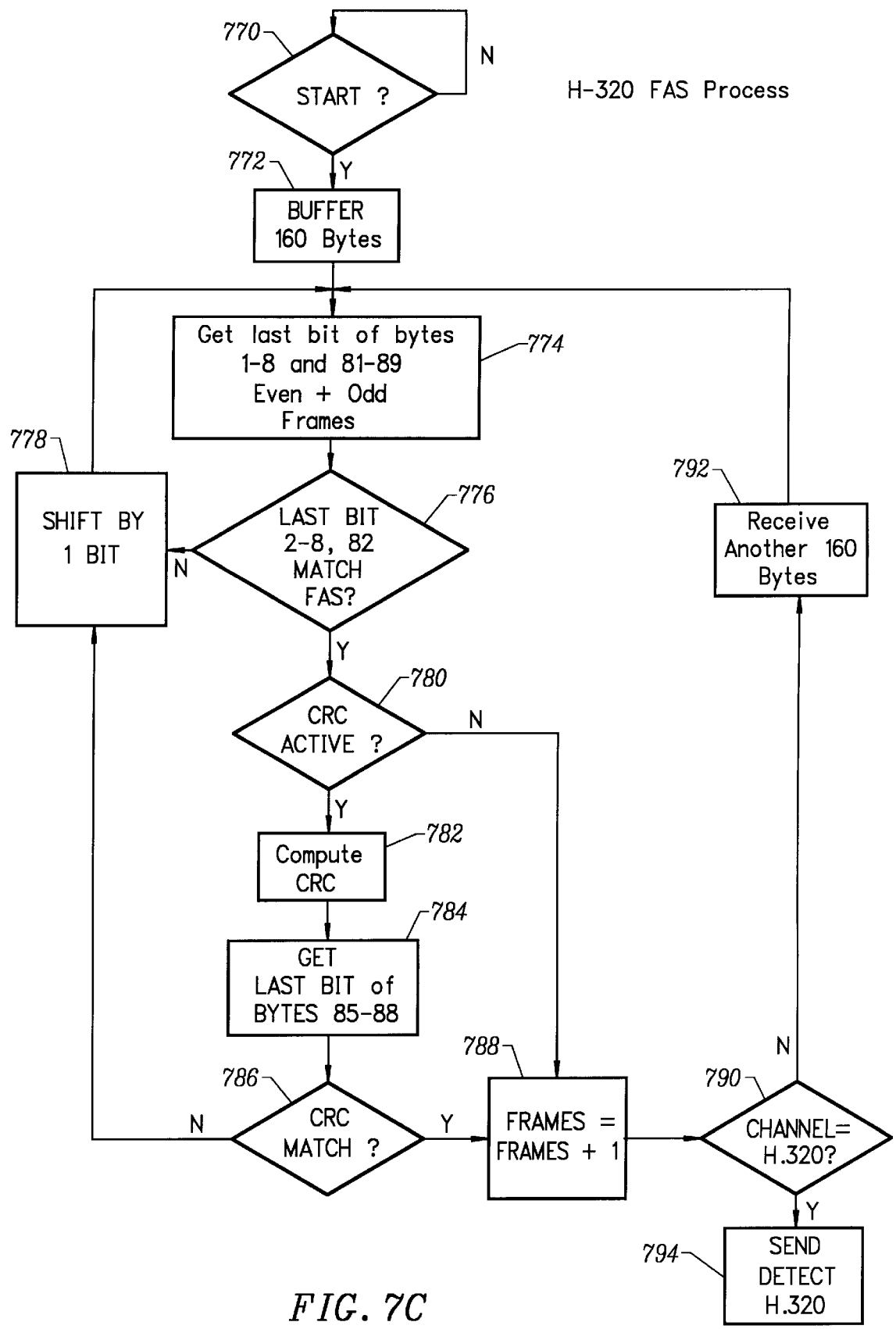

FIGS. 7A–C show the processes associated with data link layer frame protocol categorization. FIG. 7A shows the processes associated with HDLC detection. FIG. 7B shows the processes associated with POTS detection. FIG. 7C shows the processes associated with H.320 detection. These processes may be implemented in hardware or in software by one or more microprocessors operating serially or in parallel. In FIG. 7A, processing begins at decision block 700. In decision block 700, a start signal is received for a new session on a specific channel of the network to which the gateway is attached. In the example shown in FIGS. I and 4, the network is an ISDN-B line. As will be obvious to those skilled in the art, the current invention can be practiced with equal advantage on T1, E1, fractional T1, or any other circuit-switched digital networks. If a decision in the affirmative is reached, i.e., that detection processes need to be brought to bear on a new session, then checksum and frame registers are initialized and control is passed to decision process 702. In decision process 702, a determination is made as to whether the first byte being analyzed contains the flag sequence indicating the start of an HDLC frame. If that determination is in the negative, then control is passed to process 704 In process 704, incoming traffic is shifted by a bit/byte, depending on the synchronization of the incoming data stream. The ISDN-B channel, for example, can be configured to be either bit or byte synchronous. Control is then returned to decision process 702. Alternately, if in decision process 702, a determination in the affirmative is reached, i.e., that a byte sequence corresponding to the flag at the start of an HDLC frame is indicated, then control is passed to process 706. In process 706, the incoming data stream is shifted by one bit/byte, and control is passed to decision process 708. In decision process 708 a determination is made as to whether the byte of data being analyzed contains a flag sequence corresponding to the HDLC flag. If that determination is in the negative, then control passes to process 710. In process 710, the check sum register is updated to reflect the check sum value for the byte being analyzed. Control then returns to process 706.

If, alternately, in decision process 708, a determination in the affirmative is reached, i.e., that the byte being analyzed contains the HDLC flag bits, then control is passed to process 712. In process 712, the 2 byte sequence immediately preceding the flag bits is obtained. Control is then passed to decision process 714. In decision process 714, the 2 byte sequence is compared with the updated check sum. If the calculated check sum does not correspond to the value represented by the prior 2 bytes, then control is passed to process 716. In process 716, the updated check sum value is reset, and control is returned to process 706 in which the next bit or byte of data is analyzed.

If, alternately, in decision 714, a determination is made that the calculated check sum corresponds to the value of the prior 2 bytes, then a valid HDLC frame is indicated, and control passes to process 718. In process 718, the frame register initialized in decision process 700 to a zero value is up-incremented by one. Control is then passed to decision process 720. In decision process 720, a determination is made as to whether the value of the frame register, which is up-incremented with the receipt of each valid frame, corresponds to a predetermined threshold value of frames. If that determination is in the affirmative, then control is passed to process 724. In process 724, an HDLC frame detection signal is passed to channel controller 426 [see FIG. 4]. This initiates the processes described and discussed above associated with the onset of an HDLC session originating on a channel of the ISDN-B signal line 116-B [see FIG. 4]. Control returns to decision process 700.

If, alternately, in decision process 720, determination in the negative is reached, i.e., that the traffic associated with an incoming session cannot yet be categorized as HDLC in protocol, then control is passed to process 722. In process 722, the cumulative check sum value is reset to zero, and control is then returned to process 706.

FIG. 7B shows the processing associated with the categorization of incoming traffic as implementing a POTS data link layer protocol. Processing begins at decision process 750, in which a start of a new session is detected. When a new session is detected, control is passed to process 752. In process 752, an appropriate sample of the incoming traffic is obtained. Control is then passed to process 754. In process 754, the sample is analyzed for either spectral and/or power components. These components are calculated and control is then passed to decision process 756. In decision process 756, the spectral and/or power values for the incoming sample are compared with spectral and/or power values associated with a POTS session. In the event there is a match, control is passed to process 758. In process 758, a POTS detection signal is sent to channel controller 426 [see FIG. 4]. This initiates the processes associated with initiation of a POTS session originating on a channel of the ISDN-B signal line 116-B [see FIG. 4]. Control returns to decision process 750. If, alternately, in decision process 756, a negative determination is reached, i.e., that spectral and/or power levels do not match those associated with POTS traffic, then control returns to process 752.

FIG. 7C shows the processes associated with the categorization of traffic on a channel of ISDN-B line as implementing an H.320 data link layer frame protocol. Processing begins at decision process 770, in which the start of a new session is detected. When a new session on a channel of the ISDN-B signal line 116-B [see FIG. 4] is detected frame and CRC registers are initialized and control is passed to process 772. In process 772, the next 160 bytes of traffic are buffered. Control is then passed to process 774. In process 774, the last bit of bytes 1–8 and 81–89, corresponding to the prospective FAS/BAS headers for even and odd frames, is obtained. Control is then passed to decision process 776. In decision process 776, the last bit of bytes 2–8 and 82 is matched against the FAS alignment sequence, i.e., 00110111. If no match is indicated, then control passes to process 778 in which 1 bit is shifted out of the buffer and another bit is shifted in. Control then returns to process 774.

If, alternatively, in decision process 776, a determination in the affirmative is reached, i.e., that the bit sequence does correspond to the FAS sequence, then control is passed to decision process 780. In decision process 780, a determination is made on the basis of the last bit of byte 84 as to whether cyclical redundancy check (CRC) is being implemented. If a determination in the affirmative is reached, then control is passed to process 782. In process 782, a CRC for 160 byte sequence is computed in accordance with the ITU-T specification H.221 for the H.320 data link layer frame protocol. Control is then passed to process 784. In process 784, the computed CRC is compared with the last bit of bytes 85–88 of the 160 byte sequence. For valid H.320 frames, these bytes, when enabled, will contain the 4 bit CRC. Control is then passed to decision process 786. In decision process 786, the computed CRC is compared with the CRC indicated by the bits seized in process 784. In the event the computed and bit-indicated CRC do not match, then control returns to process 778.

Alternately, if a determination in the affirmative is reached, then control is passed to process 788. In process 788, a frame register initialized in start decision process 770 is up-incremented by one to indicate that a first valid H.221 frame has been received. Control is then passed to decision process 790.

If, alternately, in decision process 780, a determination is made on the basis of the last bit of byte 84, i.e., the E bit, that CRC is not enabled, then control passes directly to process 788 from decision process 780, and the frame register is up-incremented by one. Control then also passes to decision process 790.

In decision process 790, the number of valid received frames as indicated by the frame register up-incremented in process 788 is compared with a threshold number. If the threshold frame value equals the indicated number of received frames, then control passes to process 794. In process 794, an H.320 data link layer frame recognition signal is sent to channel controller 426 [see FIG. 4] and control returns to decision process 770.

This initiates the process discussed above associated with the initiation of an H.320 session of a channel of the ISDN-B signal line 116-B [see FIG. 4]. If, alternately, in decision process 790, a negative determination is reached, i.e., that the incoming traffic cannot yet be categorized as H.320 in data link layer protocol, then control is passed to process 792. In process 792, the next 160 bytes of incoming traffic are placed into the buffer. Control is then returned to process 774.

The foregoing description of a preferred embodiment of the invention has been presented for purposes of illustration and description. It is not intended to be exhaustive, or to limit the invention to the precise forms disclosed. Obviously, many modifications and variations will be apparent to practitioners skilled in this art. It is intended that the scope of the invention be defined by the following claims and their equivalents.

What is claimed is:

1. An apparatus for converting frame-type transmissions to packet-type transmissions, comprising:
   a medium access controller (MAC) coupled to a packet-based network;
   a plurality of packet assembler/disassemblers (PADs), comprising,
      a data link layer (DLL) PAD coupled to the MAC;
      a high level data link control (HDLC) PAD coupled to the DLL PAD;
      a network layer (NL) PAD coupled to the DLL PAD; and
      a NL/frame alignment sequence-bit-rate allocation signal (NL/FAS-BAS) PAD coupled to the DLL PAD; and
   plurality of detection units coupled to respective PADs, wherein each of the plurality of detection units detects a frame-type transmission.

2. The apparatus of claim 1, wherein the plurality of detection units comprises:
   an HDLC detection unit coupled to the HDLC PAD;
   a plain old telephone service (POTS) detection unit coupled to the NL PAD; and
   an FAS-BAS detection unit coupled to the NL/FAS-BAS PAD.

3. The apparatus of claim 2, further comprising:
   a channel controller coupled to the NL/FAS-BAS PAD and to the FAS-BAS detection unit; and
   a session table coupled to the channel controller.

4. The apparatus of claim 2, further comprising:
   a bridge/router controller coupled to the HDLC PAD; and
   a router table coupled to the bridge/router controller.

5. The apparatus of claim 4, further comprising a multiplexer coupled between the plurality of detection units and an integrated digital services network (ISDN), wherein the multiplexer comprises a control input coupled to the channel controller.

6. The apparatus of claim 5, wherein the HDLC detection unit comprises:
   a shift register that receives data from the multiplexer;
   a flag comparator coupled to the shift register;
   a checksum adder coupled the flag comparator and to the shift register; and
   a checksum comparator coupled to the checksum adder.

7. The apparatus of claim 5, wherein the POTS detection unit comprises:
   a shift register that receives data from the multiplexer; and
   a spectral power analyzer coupled to the shift register.

8. The apparatus of claim 5, wherein the FAS-BAS detection unit comprises
   a shift register that receives data from the multiplexer; and
   a cyclic redundancy check adder coupled to the shift register;
   a plurality of FAS comparators coupled to the shift register; and
   a cyclic redundancy check comparator coupled to the shift register.

* * * * *